United States Patent
Zhang et al.

(10) Patent No.: US 10,515,537 B2
(45) Date of Patent: *Dec. 24, 2019

(54) SYSTEMS AND METHODS FOR MONITORING ON-ROUTE TRANSPORTATIONS

(71) Applicant: BEIJING DIDI INFINITY TECHNOLOGY AND DEVELOPMENT CO., LTD., Beijing (CN)

(72) Inventors: Beibei Zhang, Beijing (CN); Xu He, Beijing (CN); Chao Tang, Beijing (CN); Zhaoxue Wu, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/167,685

(22) Filed: Oct. 23, 2018

(65) Prior Publication Data

US 2019/0088107 A1 Mar. 21, 2019

Related U.S. Application Data

(63) Continuation of application No. 15/988,913, filed on May 24, 2018, now Pat. No. 10,176,703, which is a (Continued)

(30) Foreign Application Priority Data

Jan. 26, 2016 (CN) .......................... 2016 1 0051324
Feb. 17, 2016 (CN) .......................... 2016 1 0093286
Oct. 9, 2016 (CN) .......................... 2016 1 0881276

(51) Int. Cl.
*G08B 25/01* (2006.01)
*H04W 4/029* (2018.01)
(Continued)

(52) U.S. Cl.
CPC ......... *G08B 25/016* (2013.01); *G06F 3/0484* (2013.01); *G06Q 50/265* (2013.01);
(Continued)

(58) Field of Classification Search
CPC ...... G08B 25/016; G08B 25/02; G08B 21/02; G06B 50/265
(Continued)

(56) References Cited

U.S. PATENT DOCUMENTS 6,456,207 B1 9/2002 Yen
8,554,608 B1 10/2013 O'Connor
(Continued)

FOREIGN PATENT DOCUMENTS

CN 1417065 A 5/2003
CN 1556493 A 12/2004
(Continued)

OTHER PUBLICATIONS

International Search Report in PCT/CN2016/111376 dated Mar. 9, 2017, 6 pages.
(Continued)

*Primary Examiner* — Tai T Nguyen
(74) *Attorney, Agent, or Firm* — Metis IP LLC

(57) ABSTRACT

The present disclosure relates to a method and system for monitoring on route transportations. The method includes obtaining a driving route of a target vehicle; obtaining a reference position on the driving route away from a first current position of the target vehicle; determining a second current position of the target vehicle after a reference time; determining a distance between the second current position and the reference position is greater than a preset distance; and sending a signal to a target terminal indicating that the target vehicle is off-route.

24 Claims, 14 Drawing Sheets

Related U.S. Application Data continuation of application No. 15/851,571, filed on Dec. 21, 2017, now Pat. No. 10,008,101, which is a continuation of application No. PCT/CN2016/111376, filed on Dec. 21, 2016, application No. 16/167,685, which is a continuation of application No. 15/989,338, filed on May 25, 2018, now Pat. No. 10,181,254, which is a continuation of application No. 15/851,571, filed on Dec. 21, 2017, now Pat. No. 10,008,101, which is a continuation of application No. PCT/CN2016/111376, filed on Dec. 21, 2016, application No. 16/167,685, which is a continuation of application No. 15/989,345, filed on May 25, 2018, now Pat. No. 10,176,704, which is a continuation of application No. 15/851,571, filed on Dec. 21, 2017, now Pat. No. 10,008,101, which is a continuation of application No. PCT/CN2016/111376, filed on Dec. 21, 2016.

(51) Int. Cl.

| | |
|---|---|
| *G08G 1/005* | (2006.01) |
| *G08G 1/0968* | (2006.01) |
| *G08G 1/0969* | (2006.01) |
| *G08G 1/00* | (2006.01) |
| *H04W 4/90* | (2018.01) |
| *G06Q 50/26* | (2012.01) |
| *G08B 21/02* | (2006.01) |
| *G08B 25/10* | (2006.01) |
| *G08B 25/08* | (2006.01) |
| *H04W 4/024* | (2018.01) |
| *H04W 4/44* | (2018.01) |
| *G06F 3/0484* | (2013.01) |
| *H04L 29/08* | (2006.01) |
| *G01C 21/34* | (2006.01) |
| *G06F 3/01* | (2006.01) |

(52) U.S. Cl.
CPC ............ *G08B 21/02* (2013.01); *G08B 25/08* (2013.01); *G08B 25/10* (2013.01); *G08G 1/005* (2013.01); *G08G 1/0969* (2013.01); *G08G 1/09685* (2013.01); *G08G 1/096811* (2013.01); *G08G 1/096883* (2013.01); *G08G 1/205* (2013.01); *H04W 4/024* (2018.02); *H04W 4/029* (2018.02); *H04W 4/44* (2018.02); *H04W 4/90* (2018.02); *G01C 21/3415* (2013.01); *G06F 3/017* (2013.01); *H04L 29/08* (2013.01)

(58) Field of Classification Search
USPC .................. 340/988, 994, 995, 936.69, 434; 235/382, 385
See application file for complete search history.

(56) References Cited

U.S. PATENT DOCUMENTS

| | | | |
|---|---|---|---|
| 9,922,186 B1 | 3/2018 | Kahn et al. | |
| 2002/0156646 A1* | 10/2002 | Kaiwa ................ | G06Q 30/0261 455/456.5 |
| 2005/0182563 A1 | 8/2005 | Adamski et al. | |
| 2006/0034201 A1 | 2/2006 | Umeda | |
| 2008/0277183 A1 | 11/2008 | Huang et al. | |
| 2011/0059693 A1 | 3/2011 | O'Sullivan | |
| 2011/0099040 A1 | 4/2011 | Felt et al. | |
| 2011/0202591 A1* | 8/2011 | Reis ..................... | G06Q 10/08 709/203 |
| 2012/0028599 A1 | 2/2012 | Hatton et al. | |
| 2012/0041675 A1 | 2/2012 | Juliver et al. | |
| 2012/0203599 A1 | 8/2012 | Choi et al. | |
| 2014/0375800 A1 | 12/2014 | Lim et al. | |
| 2015/0046080 A1 | 2/2015 | Wesselius et al. | |
| 2015/0161752 A1 | 6/2015 | Barreto et al. | |
| 2016/0021154 A1 | 1/2016 | Schoeffler | |
| 2016/0232719 A1 | 8/2016 | Brinig et al. | |
| 2016/0335593 A1* | 11/2016 | Clarke ............... | G06Q 10/0833 |
| 2017/0127215 A1 | 5/2017 | Khan | |
| 2017/0193404 A1* | 7/2017 | Yoo ........................ | G06Q 10/02 |
| 2018/0211543 A1 | 7/2018 | Wei | |

FOREIGN PATENT DOCUMENTS

| | | |
|---|---|---|
| CN | 1731093 A | 2/2006 |
| CN | 2757473 Y | 2/2006 |
| CN | 101368827 A | 2/2009 |
| CN | 101739817 A | 6/2010 |
| CN | 102426780 A | 4/2012 |
| CN | 104036617 A | 9/2014 |
| CN | 104422940 A | 3/2015 |
| CN | 10450092 A | 4/2015 |
| CN | 104504903 A | 4/2015 |
| CN | 104599216 A | 5/2015 |
| CN | 104794852 A | 7/2015 |
| CN | 104931064 A | 9/2015 |
| CN | 104933571 A | 9/2015 |
| CN | 104978831 A | 10/2015 |
| CN | 105096521 A | 11/2015 |
| CN | 105138590 A | 12/2015 |
| CN | 105303817 A | 2/2016 |
| CN | 105554289 A | 5/2016 |
| CN | 15652290 A | 6/2016 |
| CN | 105844902 A | 8/2016 |
| CN | 105898052 A | 8/2016 |
| JP | 3075781 U | 3/2001 |
| JP | 2002032897 A | 1/2002 |
| JP | 2004102366 A | 7/2004 |
| JP | 2005011284 A | 1/2005 |
| JP | 2006268229 A | 10/2006 |
| JP | 2009187486 A | 8/2009 |
| JP | 2015230690 A | 12/2015 |
| KR | 20110122021 A | 11/2011 |
| KR | 20130034380 A | 4/2013 |
| KR | 20140108466 A | 9/2014 |
| WO | 2004111912 A1 | 12/2004 |

OTHER PUBLICATIONS

Written Opinion in PCT/CN2016/111376 dated Mar. 9, 2017, 5 pages.
Examination Report in Australian Application No. 2016390249 dated Jun. 29, 2018, 5 pages.
Notice of Preliminary Rejection in Korean Application No. 10-2017-7036883 dated Jan. 21, 2019, 6 Pages.
The Extended European Search Report in European Application No. 16887761.1 dated Jan. 29, 2019, 10 Pages.
Search Report in Singaporean Application No. 11201710282R dated Jul. 26, 2019, 8 pages.

* cited by examiner

FIG. 9-A

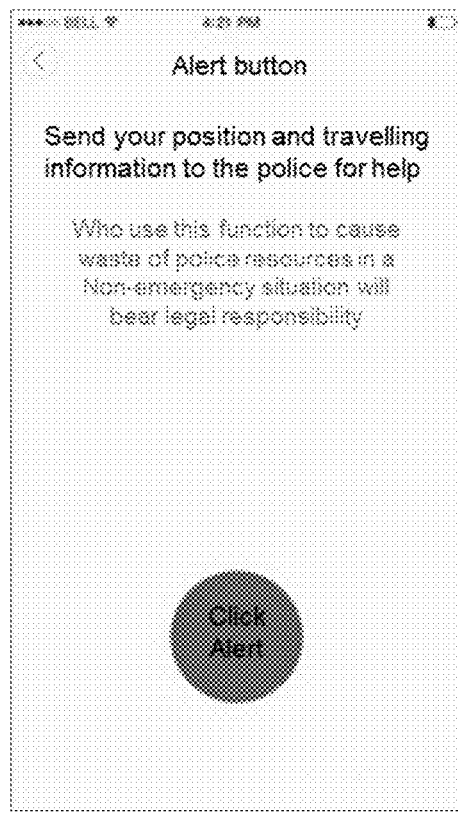
FIG. 9-B

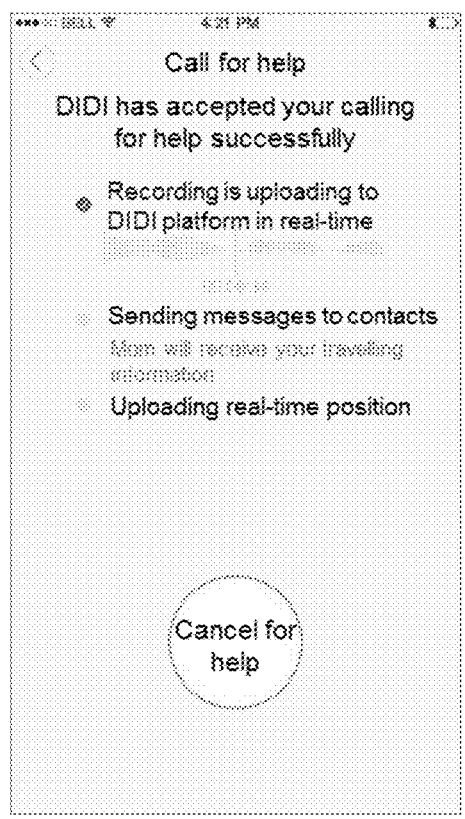
FIG. 9-C

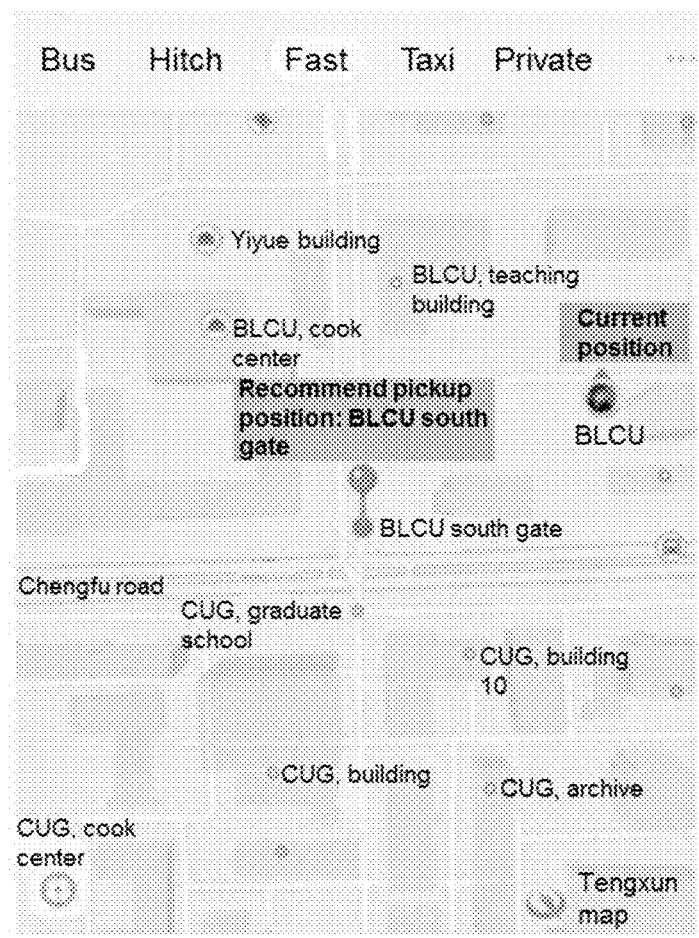
FIG. 11-A

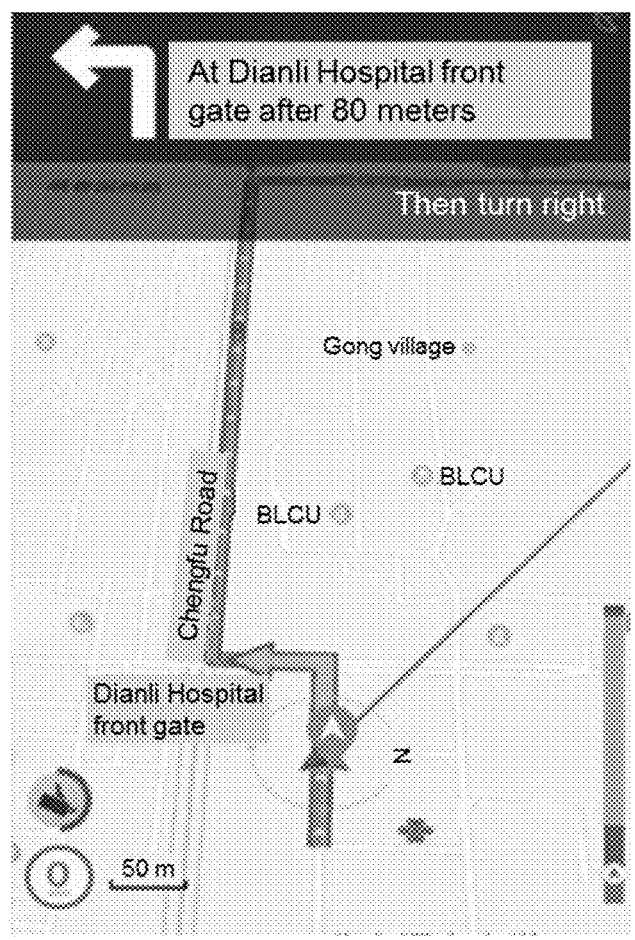
FIG. 11-B

SYSTEMS AND METHODS FOR MONITORING ON-ROUTE TRANSPORTATIONS

CROSS-REFERENCE TO RELATED APPLICATIONS

This application is a continuation of U.S. patent application Ser. No. 15/988,913 (now U.S. Pat. No. 10,176,703), filed on May 24, 2018, a continuation of U.S. patent application Ser. No. 15/989,338 (now U.S. Pat. No. 10,181,254), filed on May 25, 2018, and a continuation of U.S. patent application Ser. No. 15/989,345 (now U.S. Pat. No. 10,176,704), filed on May 25, 2018, all of which are continuations of U.S. patent application Ser. No. 15/851,571 (now U.S. Pat. No. 10,008,101), filed on Dec. 21, 2017, which is a continuation of International Application No. PCT/CN2016/111376, filed on Dec. 21, 2016, designating the United States of America, which claims priority of Chinese Patent Application No. 201610051324.7 filed on Jan. 26, 2016, Chinese Patent Application No. 201610093286.1 filed on Feb. 17, 2016, and Chinese Patent Application No. 201610881276.4 filed on Oct. 9, 2016, the entire contents of each of which are hereby incorporated by reference.

TECHNICAL FIELD

This application relates generally to management of transportation of services. Specifically, the present disclosure relates to online monitoring of on-route transportation of vehicles.

BACKGROUND

On-demand services, such as transportation service, hailing services, heavily rely on vehicle management systems for vehicle dispatching. Vehicle management systems employed for taxi and limousine typically use onboard metering devices, radios, and cell phones to dispatch drivers. Such a system typically is not communicative to customer passengers who request the transportation services, and/or does not monitor the distribution of their customers that are waiting for pickup.

SUMMARY

In a first aspect of the present disclosure, a system is provided. The system includes at least one processor and a computer-readable storage medium storing a first set of instructions for monitoring a target vehicle. When executing the first set of instructions, the at least one processor is detected to: obtain a driving route of the target vehicle; obtain a reference position on the driving route away from a first current position of the target vehicle; determine a second current position of the target vehicle after a reference time; determine a distance between the second current position and the reference position is greater than a preset distance; and send a signal to a target terminal indicating that the target vehicle is off-route.

In a second aspect of the present disclosure, a method is provided. The method is related to the method of monitoring a target vehicle. The method includes obtaining a driving route of a target vehicle; obtaining a reference position on the driving route away from a first current position of the target vehicle; determining a second current position of the target vehicle after a reference time; determining a distance between the second current position and the reference position is greater than a preset distance; and sending a signal to a target terminal indicating that the target vehicle is off-route.

In a third aspect of the present disclosure, a system is provided. The system includes at least one processor and a computer-readable storage medium storing a second set of instructions for sending emergency information. When executing the second set of instructions, the at least one processor is detected to: initiate a transportation transaction between a first party and a second party through an online transportation service platform; send registration information of the second party to the first party; determine an occurrence of an emergency to the first party; and send an emergency alert including a position of the occurrence of the emergency and registration information to a target terminal.

In a fourth aspect of the present disclosure, a method is provided. The method is related to the method of sending emergency information. The method includes initiating a transportation transaction between a first party and a second party through an online transportation service platform; sending registration information of the second party to the first party; determining an occurrence of an emergency to the first party; and sending an emergency alert including a position of the occurrence of the emergency and registration information to a target terminal.

In a fifth aspect of the present disclosure, a system is provided. The system includes at least one processor and a computer-readable storage medium storing a third set of instructions for sending identification information of a safe mode. When executing the third set of instructions, the at least one processor is detected to: establish a communication between a first party and a second party through an online transportation service platform; obtain the identification information of the safe mode of the first party from the first party; and inform the second party that the first party is in the safe mode upon obtaining the identification information of the safe mode.

In a sixth aspect of the present disclosure, a method is provided. The method is related to the method of sending identification information of a safe mode. The method includes establishing a communication between a first party and a second party through an online transportation service platform; obtaining the identification information of the safe mode of the first party from the first party; and informing the second party that the first party is in the safe mode upon obtaining the identification information of the safe mode.

In a seventh aspect of the present disclosure, a system is provided. The system includes at least one processor and a computer-readable storage medium storing a fourth set of instructions for sending at least one point of interest (POI). When executing the fourth set of instructions, the at least one processor is detected to: initiate a transportation transaction between a first party and a second party through an online transportation service platform; obtain a POI driving route of a first party, wherein the POI driving route includes at least one POI; and send the POI driving route to the first party when the first party is within a predetermined distance from the at least one POI.

In an eighth aspect of the present disclosure, a method is provided. The method is related to the method of sending at least one point of interest (POI). The method includes initiating a transportation transaction between a first party and a second party through an online transportation service platform; obtaining a POI driving route of a first party, wherein the POI driving route includes at least one POI; and sending the POI driving route to the first party when the first party is within a predetermined distance from the at least one POI.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 9-A is a primary view of an exemplary user interface of the online transportation service platform for displaying alert tutorial information according to some embodiments of the present disclosure;

FIG. 9-B is a variation diagram of an exemplary user interface displaying an alert button according to some embodiments of the present disclosure;

FIG. 9-C is a variation diagram of an exemplary user interface displaying online help information according to some embodiments of the present disclosure;

FIG. 11-A is a primary view of an exemplary user interface of the online transportation service platform for displaying a map including a pickup position according to some embodiments of the present disclosure; and FIG. 11-B is a primary view of an exemplary user interface of the online transportation service platform for displaying a map including a part of a POI driving route according to some embodiments of the present disclosure.

DETAILED DESCRIPTION

Figure 1:
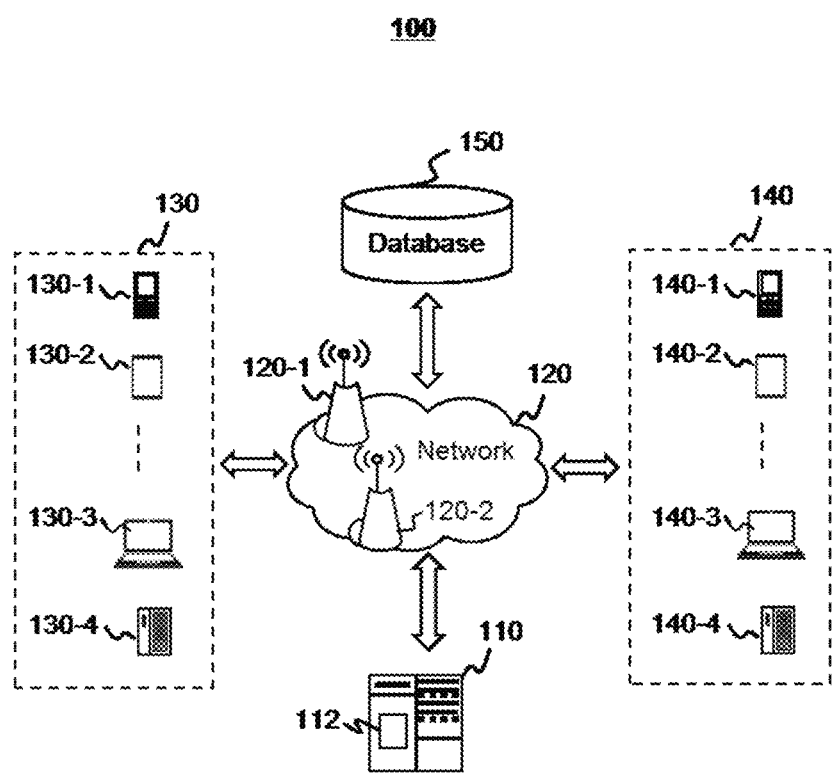
FIG. 1 is a block diagram of an exemplary on-demand service system according to some embodiments of the present disclosure.

In the following detailed description, numerous specific details are set forth by way of examples in order to provide a thorough understanding of the relevant teachings. However, it should be apparent to those skilled in the art that the present disclosure may be practiced without such details. In other instances, well known methods, procedures, systems, components, and/or circuitry have been described at a relatively high level, without detail, in order to avoid unnecessarily obscuring aspects of the present disclosure.

The present disclosure describes methods and systems for monitoring on-route transportations that may carry a service requester, a service provider, and/or goods. The methods and systems as disclosed herein aim at determining the travelling condition of one or more parties associated with the transportations. The travelling condition may include a driving route of the transportation, a current position of the transportation, whether the transportation is on-route or not, whether there is an occurrence of emergency, or the like, or any combination thereof. The methods and systems as disclosed herein also provide ways for preventing, and/or responding to the occurrence of emergency. The ways may include sending a route of the transportations, providing safe mode transportations, monitoring or recoding the transportations, sending an emergency alert, or the like, or any combination thereof.

The systems and methods for monitoring transportations may be used in different transportation systems (transportation includes but is not limited to land transportation, sea transportation and air transportation, or the like, or a combination thereof) including, such as vehicle management system employed for taxi and limousine, intra-city express delivery system, or the like. It is understood that these exemplary applications of the system and method disclosed herein are provided for illustration purposes, and not intended to limit the scope of the present disclosure. The disclosed system and method may be applied in other contexts, e.g., other on-demand services.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

In the present disclosure, a "user," a "passenger," a "requester," a "service requester," and a "customer" are used interchangeably to refer to individuals that are requesting or ordering a service. Also, a "provider," a "service provider," and a "supplier" are used interchangeably to refer to an individual, an entity or a tool that may provide a service or facilitate the providing of the service. The term "party" may refer to an individual that is requesting or ordering a service, or an individual, an entity that may provide a service. The term "user terminal" in the present disclosure may refer to a tool that may be used to request a service, order a service, facilitate the requesting of the service, provide a service, or facilitate the providing of the service.

Vehicles of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a webpage, a plug-in of a browser, a client terminal, a custom system, an internal analysis system, an artificial intelligence robot, or the like, or any combination thereof.

The term "service request" and "order" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to online systems and methods for monitoring on-route transportations. The systems and methods may do so by obtaining a driving route of a target vehicle, obtaining a reference position on the driving route of the target vehicle, determining a current position of the target vehicle and determining whether the target vehicle is on route or not based on the reference position and the current position.

It should be noted that online on-demand transportation service, such as online taxi hailing including taxi hailing combination services, is a new form of service rooted only in post-Internet era. It provides technical solutions to users and service providers that could raise only in post-Internet era. In pre-Internet era, when a user hails a taxi on street, the taxi request and acceptance occur only between the passenger and one taxi driver that sees the passenger. If the passenger hails a taxi through telephone call, the service request and acceptance may occur only between the passenger and one service provider (e.g., one taxi company or agent). Online taxi, however, allows a user of the service to real-time and automatic distribute a service request to a vast number of individual service providers (e.g., taxi) distance away from the user. It also allows a plurality of service provides to respond to the service request simultaneously and in real-time. Therefore, through Internet, the online on-demand transportation systems may provide a much more efficient transaction platform for the users and the service providers that may never met in a traditional pre-Internet transportation service system.

FIG. 1 is a block diagram of an exemplary on-demand service system 100 according to some embodiments of the present disclosure. For example, the on-demand service system 100 may be an online transportation service platform for transportation services such as taxi hailing, chauffeur service, express car, carpool, bus service, driver hire and shuttle service. The on-demand service system 100 may be an online platform including a server 110, a network 120, a requestor terminal 130, a provider terminal 140, and a database 150. The server 110 may include a processing engine 112.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the requestor terminal 130, the provider terminal 140, and/or the database 150 via the network 120. As another example, the server 110 may be directly connected to the requestor terminal 130, the provider terminal 140, and/or the database 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may determine a target vehicle based on the service request obtained from the requestor terminal 130. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the on-demand service system 100 (e.g., the server 110, the requestor terminal 130, the provider terminal 140, and the database 150) may send information and/or data to other component(s) in the on-demand service system 100 via the network 120. For example, the server 110 may obtain/acquire service request from the requestor terminal 130 via the network 120. In some embodiments, the network 120 may be any type of wired or wireless network, or combination thereof. Merely by way of example, the network 130 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a requestor may be a user of the requestor terminal 130. In some embodiments, the user of the requestor terminal 130 may be someone other than the requestor. For example, a user A of the requestor terminal 130 may use the requestor terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may use the provider terminal 140 to receive a service request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the requestor terminal 130 may be a device with positioning technology for locating the position of the requestor and/or the requestor terminal 130.

In some embodiments, the provider terminal 140 may be similar to, or the same device as the requestor terminal 130. In some embodiments, the provider terminal 140 may be a device with positioning technology for locating the position of the provider and/or the provider terminal 140. In some embodiments, the requestor terminal 130 and/or the provider terminal 140 may communicate with other positioning device to determine the position of the requestor, the requestor terminal 130, the provider, and/or the provider terminal 140. In some embodiments, the requestor terminal 130 and/or the provider terminal 140 may send positioning information to the server 110.

The database 150 may store data and/or instructions. In some embodiments, the database 150 may store data obtained from the requestor terminal 130 and/or the provider terminal 140. In some embodiments, the database 150 may store data and/or instructions that the server 110 may execute or use to perform exemplary methods described in the present disclosure. In some embodiments, database 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 150 may be connected to the network 120 to communicate with one or more components in the on-demand service system 100 (e.g., the server 110, the requestor terminal 130, the provider terminal 140, etc.). One or more components in the on-demand service system 100 may access the data or instructions stored in the database 150 via the network 120. In some embodiments, the database 150 may be directly connected to or communicate with one or more components in the on-demand service system 100 (e.g., the server 110, the requestor terminal 130, the provider terminal 140, etc.). In some embodiments, the database 150 may be part of the server 110.

In some embodiments, one or more components in the on-demand service system 100 (e.g., the server 110, the requestor terminal 130, the provider terminal 140, etc.) may have a permission to access the database 150. In some embodiments, one or more components in the on-demand service system 100 may read and/or modify information relating to the requestor, provider, and/or the public when one or more conditions are met. For example, the server 110 may read and/or modify one or more users' information after a service. As another example, the provider terminal 140 may access information relating to the requestor when receiving a service request from the requestor terminal 130, but the provider terminal 140 may not modify the relevant information of the requestor.

In some embodiments, information exchanging of one or more components in the on-demand service system 100 may be achieved by way of requesting a service. The object of the service request may be any product. In some embodiments, the product may be a tangible product, or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
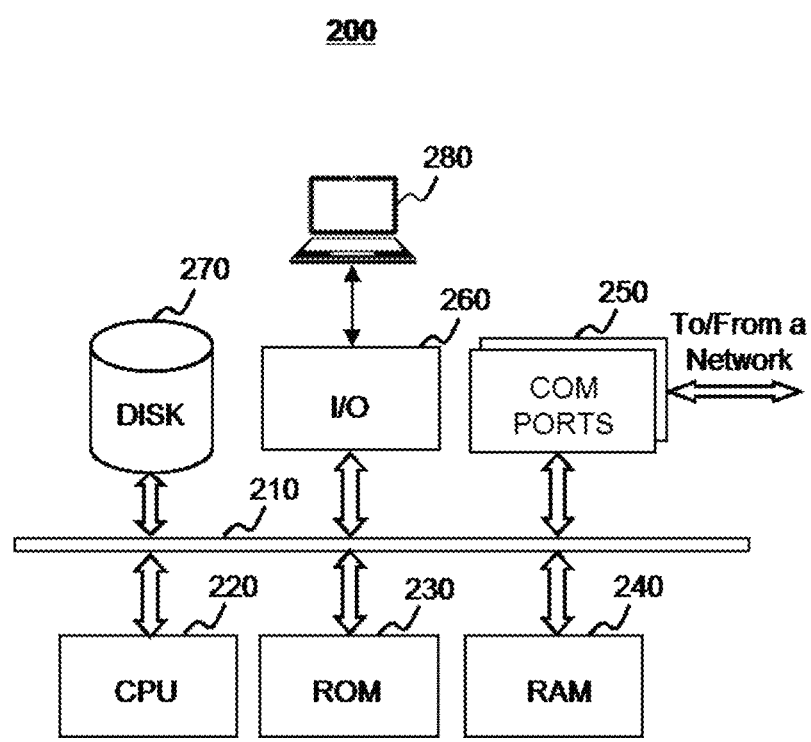
FIG. 2 is a schematic diagram illustrating exemplary hardware and software components of a computing device on which the server, the requestor terminal, and/or the provider terminal may be implemented according to some embodiments of the present disclosure.

FIG. 2 is a schematic diagram illustrating exemplary hardware and software components of a computing device 200 on which the server 110, the requestor terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be a general purpose computer or a special purpose computer, both may be used to implement an on-demand system for the present disclosure. The computing device 200 may be used to implement any component of the on-demand service as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processing unit (CPU) 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or other type of non-transitory storage medium to be executed by the CPU 220. The methods and/or processes of the present disclosure may be implemented as the program instructions. The computing device 200 may also include an I/O component 260, supporting input/output between the computer and other components therein such as user interface elements 280. The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
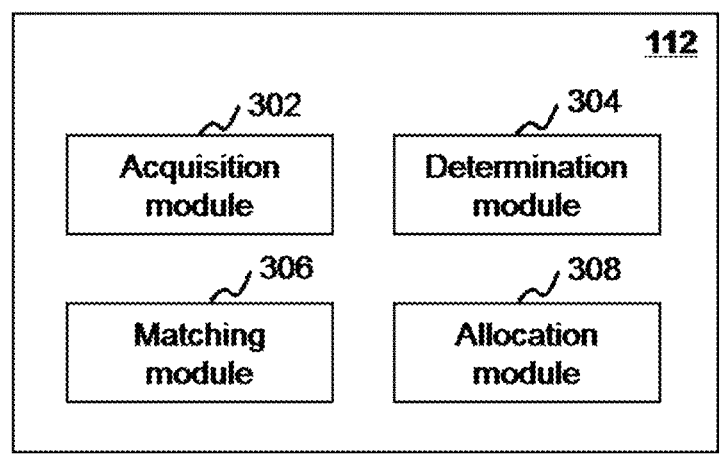
FIG. 3 is a block diagram illustrating an exemplary processing engine according to some embodiments of the present disclosure.

FIG. 3 is a block diagram illustrating an exemplary processing engine 112 according to some embodiments of the present disclosure. The processing engine 112 may include an acquisition module 302, a determination module 304, a matching module 306, and an allocation module 308.

The acquisition module 302 may be configured to obtain a plurality of orders from a plurality of requestors. As used herein, the system 100 may generate an order based on a request for an on-demand service sent by a requestor. It should be noted that in the disclosure there is no substantial difference between an order and a request.

The on-demand service may be a transportation service for a taxi, a private vehicle, a bus, a truck, a test drive, a designated driving, or the like, or a combination thereof. In some embodiments, the on-demand service may be any on-line service, such as booking a meal, shopping, or the like, or a combination thereof. In some embodiments, the requestor may choose whether to agree to share a service with other requestors in the on-demand service request. For example, the requestor may disagree to share a service with other requestors in any circumstances. As another example, the requestor may agree to share a service with other requestors under some situations (e.g., in traffic peak period).

The acquisition module 302 may obtain the plurality of orders from the requestor terminal 130 via the network 120. The acquisition module 302 may further obtain features (e.g., a start location, a destination) of the plurality of orders.

The determination module 304 may be configured to determine matching information of the plurality of orders based on the features. The determination module 304 may determine matching information between any two of the plurality of orders. The matching information may indicate whether the two orders may be sharable.

The matching module 306 may be configured to determine a set of sharable orders based on the matching information. As used herein, a sharable order may refer to an order that may be combined with other order(s). For example, if order A and order B include a similar start location or a similar destination, the matching module 306 may determine order A and order B as sharable orders. As used herein, a similar start location may refer to a start location of order A is reasonably close to a start location of order B for an ordinary person in the art. For example, if a distance between the start location of order A and the start location of order B is less than a threshold, such as 500 meters, 1 kilometer, or 1.5 kilometer, the system 100 may determine that the order A and order B include a similar start location. Likewise, the system may determine the similar destination in a similar way.

The allocation module 308 may allocate the set of sharable orders to providers. For example, the allocation module 308 may combine two of the set of sharable orders as an order group and allocate the order group to a provider (e.g., a driver).

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the acquisition module 302 may be integrated in the determination module 304 as a single module which may both obtain features of orders and determine matching information of the orders.

Figure 4:
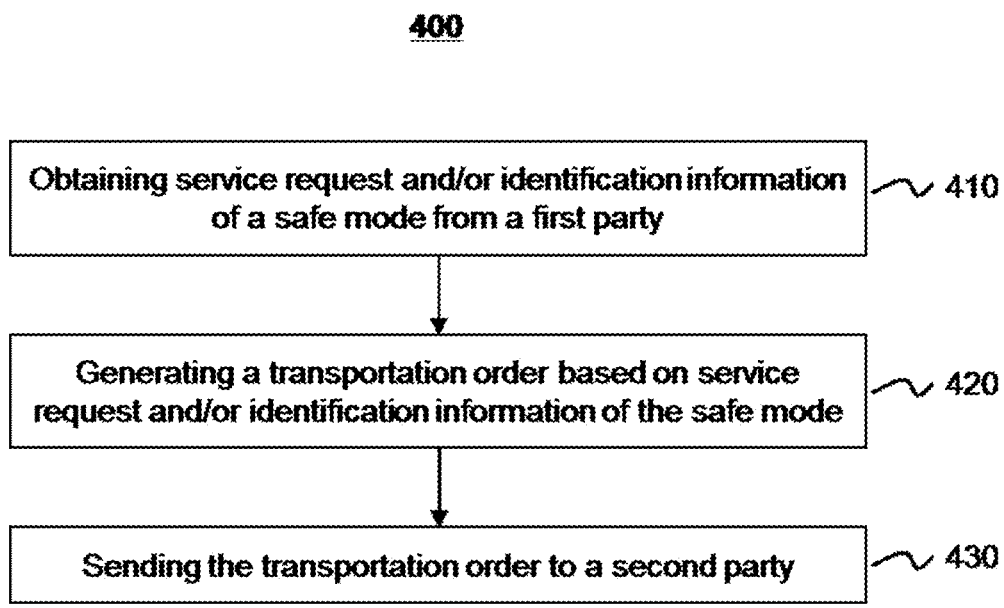
FIG. 4 is a flowchart of an exemplary method and/or process for transmitting identification information of a safe mode between parties according to some embodiments of the present disclosure.

FIG. 4 is a flowchart of an exemplary method and/or process for transmitting identification information of safe mode between parties according to some embodiments of the present disclosure. The process and/or method may be operated by a computer server (e.g., the server 110) of an online transportation service platform of the on-demand service system 100. For example, the method and/or process may be implemented as a set of instructions and stored in at least one storage medium of the online transportation service platform. At least one processor of a computer server of the platform may communicate with the storage medium and execute the set of instructions to perform the following steps.

In some embodiments, one or more passengers may book and/or obtain transportation services via an online transportation service platform, such as the on-demand service system 100, while one or more drivers may provide transportation services via the online transportation service platform. The passenger(s) may access the online transportation service platform through a user terminal (e.g., a requestor terminal 130). The driver(s) may access the online transportation service platform through another user terminal (e.g., a provider terminal 140). The user terminal may be a mobile terminal or a personal computer (PC). The user terminal may include smartphone, personal digital assistant (PDA), tablet computer, laptop, carputer (board computer), play station portable (PSP), smart glasses, smart watch, wearable devices, virtual display device, or display enhanced equipment (e.g. Google Glass, Oculus Rift, Hololens, Gear VR), or the like, or any combination thereof.

The passenger(s) may send a service request to a computer server of the online transportation service platform through the passenger terminal. The service request may generally include departure information and destination information of the passenger(s). The service request may also include a real-time position of the passenger, a passenger identity, a specific time of the sending of the service request, or the like, or any combination thereof. Therein the passenger identity may include telephone number, identity number, IP (Internet Protocol) address, MAC (Media Access Control) address, or the like, or any combination thereof. The computer server may receive the service request. The computer server may obtain a position of the passenger(s).

The computer server may send the service request to one or more driver terminals that login the platform. The driver(s) may receive the service request through the driver terminal and decide whether or not to respond the service request. When a driver accept the service request, the computer server may initiate a transportation transaction between the passenger(s) and the driver.

In some embodiments, two or more passengers may carpool via the online transportation service platform. It may be indicated that when a driver is providing a first transportation service to a first passenger, the driver may respond a second transportation service sent from a second passenger. The driver may pick up the second passenger before dropping off the first passenger, and the two passengers may carpool.

In some embodiments, a transportation transaction may involve two parties. One party may refer to a transportation service provider (e.g., a driver), while the other party may refer to a service requestor (e.g., one or more passengers). In some embodiments, two or more transportation transactions may be intertwined. For example, a transportation service provider may provide two transportation services at the same time, wherein the two transportation services may be originated from two different transportation transactions (i.e., two or more passengers may be carpooling). That is to say, a running vehicle may involve two or more parties, including a transportation service provider, a first service requester, and/or a second service requester, or the like.

In some embodiments, danger or emergency situation may occur in a running vehicle. In some embodiments, the danger or emergency situation may come from an accident. In some embodiments, the danger or emergency situation may come from one or more parties as illustrated above. Merely by way of example, the emergency may occur when a transportation service provider hijacks a service requester (e.g., the driver is a robber.). As another example, the emergency may occur when a service requester hijacks a transportation service provider (e.g., the passenger is a robber.). As still another example, the emergency may occur when a first service requester hijacks a second service requester (e.g., a kidnapper hails a taxi.).

To prevent the occurrence of the danger or emergency situation, the online transportation service platform may provide a safe mode service(s) to one or more of the parties in a transportation transaction. For example, the online transportation service platform may provide the safe mode service to the passenger and/or the driver during a taxi service. Under safe mode, the online transportation service platform may monitor one or more of the parties to ensure safety of the parties. For example, when the transportation service provider accesses the safe mode, the online transportation service platform may monitor the service requestor(s). As another example, when the service requestor accesses the safe mode, the online transportation service platform may monitor the transportation service provider. Alternatively, the online transportation service platform may monitor the transportation service requester and/or provider regardless of which party initiated the safe mode service through his/her corresponding terminal device. For example, the safe mode may be a function provided in an application installed in a taxi driver and/or a passenger's smart phone. Both the taxi driver and the passenger may login the online transportation service platform via their smart phones. The passenger may hail the taxi via the application. When the taxi picks up the passenger, the taxi driver, the passenger, or both may independently initiate the safe mode. Upon receiving the request to access the safe mode from the taxi driver and/or the passenger, one or more computer servers of the online transportation service platform may monitor the taxi driver, the taxi, and/or the passenger via their respective smart phone.

In some embodiments, the online transportation service platform may inform other parties in the transaction when one party is in the safe mode. For example, when the passenger initiate the safe mode, the online transportation service platform may inform the driver that the passenger has initiated the safe mode, so that the driver knows his/her transportation service is monitored or to be monitored. As illustrated below, the online transportation service platform may transmit identification information of the safe mode between the parties.

In step 410, a computer server may obtain service request and/or identification information of the safe mode from a first party. The online transportation service platform may provide general mode service(s) and the safe mode service(s) for the first party. The first party may choose to access the general mode and the safe mode. In some embodiments, the service(s) may set the general mode as system default. Identification information of the safe mode may refer to information (e.g., a notice, a tag, or the like) that indicate the first party has access the safe mode. The first party may refer to a service requestor/receiver, or the like. The first party may access the safe mode through a user interface of a first user terminal. For example, a passenger may access the safe mode through a user interface of an application installed in a passenger terminal. In some embodiments, the user interface of the first user terminal may provide a safe mode button for the first party to access the safe mode. In some embodiments, the user interface of the first user terminal may provide a mode selection function for the first party. The first party may access the safe mode before a transportation transaction is initiated.

In some embodiments, when the first party is a service requestor, for example, a passenger, the identification information of the safe mode may be generated when the passenger sends a service request to the computer server. The passenger may use a passenger terminal to access the online transportation service platform and input travel information, such as the departure information and destination information, or the like. At the same time, the passenger may choose to access the safe mode. In some embodiments, the passenger may select the safe mode when accessing the online transportation service platform. The passenger terminal may send a transportation service request associated with the travel information to the computer server. In the safe mode, the passenger terminal may send the identification information of the safe mode together with the transportation service request to the computer server. The computer server may obtain information sent from the first party accessing the online transportation service platform via the network 120. The information may include the identification information of the safe mode, and/or the transportation service request, or the like.

In step 420, the computer server may generate a transportation order based on the service request and/or identification information of the safe mode. The order information may include the identification information of the safe mode, the travel information, or the like, or any combination thereof.

In step 430, the computer server may send the transportation order to a second party. In some embodiments, the second party may refer to one or more transportation service providers, or the like. In some embodiments, the second party may refer to a plurality of driver terminals within a predetermined range within the departure position or the position where the service request is sent out.

In the safe mode, the computer server may remind the driver terminal(s) that the transportation order is associated with identification information of the safe mode. In some embodiments, the driver terminal(s) may display the identification information of the safe mode in a user interface. The driver(s) may distinguish between the transportation orders of general mode and the safe mode via the user interface colors of the driver terminal(s). For example, the color of the user interface in general mode may be yellow, while the color of the user interface in the safe mode may be red. The scope of the present disclosure does not intend to limit the display manner of the identification information of the safe mode.

In some embodiments, a transportation service provider, for example, a driver, may access the safe mode. The driver may use a driver terminal to access the online transportation service platform. The driver may choose the safe mode when accessing the online transportation service platform, responding the service request, or any time there between. The identification information of the safe mode may be generated when the driver responds a service request. In the safe mode, the driver terminal may send the identification information of the safe mode together with an order taking request to the computer server. When the computer server initiates a transportation transaction between the driver and a passenger according to the service request and order taking request, the computer server may send the identification information of the safe mode to a passenger terminal of the passenger. The passenger terminal may display the identification information of the safe mode in a user interface of an application installed in the passenger terminal.

In some embodiments, after the computer server initiates a transportation transaction between a service requestor and a transportation service provider, the service requestor and/or the transportation service provider may access the safe mode. Identification information of the safe mode may be generated in real time and sent to the computer server. The computer server may send the identification information of the safe mode to the transportation service provider or service requestor. A user terminal of the transportation service provider or service requestor may display the identification information of the safe mode.

In some embodiments, when or after the computer server initiates a transportation transaction, the service provider may pick up the service requestor in a pickup position. In some embodiments, the pickup position of the transportation transaction may be a current position of the service requestor. Alternatively, the pickup position may be different from a current position of a service requestor. In some embodiments, the pickup position may be different from a current position of a transportation service provider. The computer server may generate one or more navigation routes for the service requestor and/or the transportation service provider. The navigation routes may guide the service requester and/or the transportation service provider to the pickup position. In some embodiments, the pickup position may be preset by the service requestor when the service request is sent to the computer server. In some embodiments, the pickup position may be determined by the computer server. For example, the computer server may determine a point of interest (POI) as the pickup position. The POI may be near the current position of the service requestor or the transportation service provider. As illustrated below, the detailed process may be described in FIG. 5.

Figure 5:
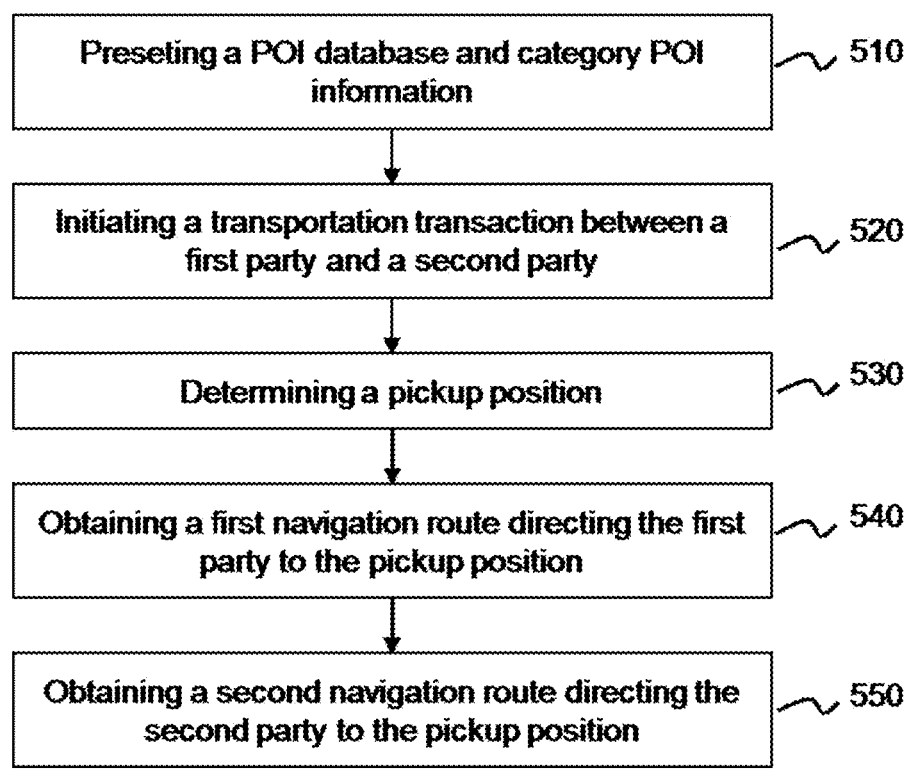
FIG. 5 is a flowchart of an exemplary method and/or process for guiding a first party and/or a second party to a pick up position according to some embodiments of the present disclosure.

FIG. 5 is a flowchart of an exemplary method and/or process for guiding a first party and/or a second party to a pick up position according to some embodiments of the present disclosure. The process and/or method may be operated by a computer server (e.g., the server 110) of an online transportation service platform of the on-demand service system 100. For example, the method and/or process may be implemented as a set of instructions and stored in at least one storage medium of the online transportation service platform. At least one processor of a computer server of the platform may communicate with the storage medium and execute the set of instructions to perform the following steps.

In step 510, the computer server may preset a POI database and category POI information. The POI database may include one or more POIs. A POI may refer to a point of interest including a building or a road, for example, a shopping mall, a park, a school, a hospital, a hotel, a restaurant, a supermarket, a tourist attraction, a landmark, or the like, or any combination thereof. Each POI may have corresponding POI information. The POI information of a POI may refer to information regarding the POI, including, for example, a POI name, a POI position, a POI orientation, or the like, or any combination thereof. Merely by way of example, in New York City, a POI name may be Times Square, a POI position may be the geographical location of Times Square, a POI orientation may be the south of Times Square.

In some embodiments, the computer server may obtain the POI information within a proper range, for example, a block, a city, a district, a country, or the like, or any combination thereof. The POI information may be obtained by manual collection, package upload, street view collection, satellite data collection, or the like, or any combination thereof. In some embodiments, the computer server may update the POI information based on terminal (e.g., the requestor terminal 130, the provider terminal 140, etc.) feedback information. The computer server may preset a POI database based on the POI information obtained. The POI database may include POI information of one or more POIs.

In some embodiments, the computer server may category POI information in the POI database. The computer server may category POI information based on a road direction. A road may have two directions. Along different directions of the road, there may have different POI information. In some embodiments, POI information along the same direction of the road may be regarded as the same category. In some embodiments, there may exist several POIs in a road, but the POI information may be distinct in different forward direction. For example, there may be five POIs named A, B, C, D, and E in a road extending along north-south direction. When the forward direction of the driver is from the north to the south, the POI may be A, B, and D within a visible range of the driver on one side of the road (e.g., on the right side of the forward direction, i.e., the west side of the road); when the forward direction of the driver is from the south to the north in the same road, the POI may be C and E within a visible range of the driver on the other side of the road (e.g., on the right side of the forward direction, i.e., the east side of the road). In some embodiments, a POI orientation may include a doorway of a POI, a corner of a POI, one side of the driver forward direction, an opposite side of the driver forward direction, a diagonally opposite position of a POI, or the like, or any combination thereof. For example, Peking university east gate, Zhong guancun square north side, or the like.

In step 520, the computer server may initiate a transportation transaction between a first party and a second party. The first party and/or the second party may be one of the parties mentioned above. For example, the first party may be a passenger, and the second party may be a driver. The computer server may initiate the transportation transaction based on a service request sent from the passenger. The service request may include a desired departure position.

In step 530, the computer server may determine a pick up position. In some embodiments, the computer server may determine the pickup position as the desired departure position of the passenger, a current position of the passenger, a current position of the driver, or the like. In some embodiments, the pickup position may be determined as a POI within a predetermined range (e.g., the nearest POI) of the desired departure position of the passenger, the current position of the passenger, the current position of the driver, or the like. In some embodiments, the POI information of the nearest POI may be specific enough to direct the first party and/or the second party to the pickup position. Otherwise, it may have bad influence on the passenger experience, cause the withdrawal of the transportation transaction, or reduce the income of a driver. In some embodiments, the pickup position may include the POI information, for example, a name of the POI, a position coordinate of the POI, an orientation corresponding to the POI, or the like, or any combination thereof.

In step 540, the computer server may obtain a first navigation route directing the first party (e.g., a passenger) to the pickup position. In some embodiments, the first navigation route may be a route from the departure position of the passenger or the current position of the passenger to the pickup position. In some embodiments, the first navigation route may be a route with a relatively short walking distance, or a relatively short walking time. The computer server may send the first navigation route to a user terminal of the first party. The user terminal of the first party may display the first navigation route, and the first navigation route may guide the first party to the pickup position.

In step 550, the computer server may obtain a second navigation route directing the second party (e.g., a driver) to the pickup position. In some embodiments, the second navigation route may be a route from the current position of the driver to the pickup position. In some embodiments, the second navigation route may be a route with a relatively short driving time, a relatively short driving distance. In some embodiments, the second navigation route may be a route avoiding road congestion. The computer server may deliver the second navigation route to a user terminal of the second party. The user terminal of the second party may display the second navigation route, and the second navigation route may guide the second party to the pickup position.

In some embodiments, the first (or second) driving route may have one or more POIs different from the pickup position. When the first (or second) party goes forward along the first (or second) driving route, the computer server may send information regarding the POI(s) name, whether need to change direction, and/or when to change direction to the first (or second) party. Thus, the first (or second) party may not need to watch the driving route shown in the user terminal.

In some embodiments, when a second party (e.g., a driver) picks up a first party (e.g., a passenger), the second party may drive a vehicle towards a desired destination position. In some embodiments, an unmanned vehicle may provide transportation service to a passenger. In some embodiments, a vehicle driven by a driver or unmanned vehicle may transport goods from a departure position to a destination position. To understand the vehicle transportation situation or ensure the safety of a passenger, a driver, and/or a vehicle, the vehicle may be monitored. As illustrated below, a detailed monitoring process may be described in FIG. 6.

Figure 6:
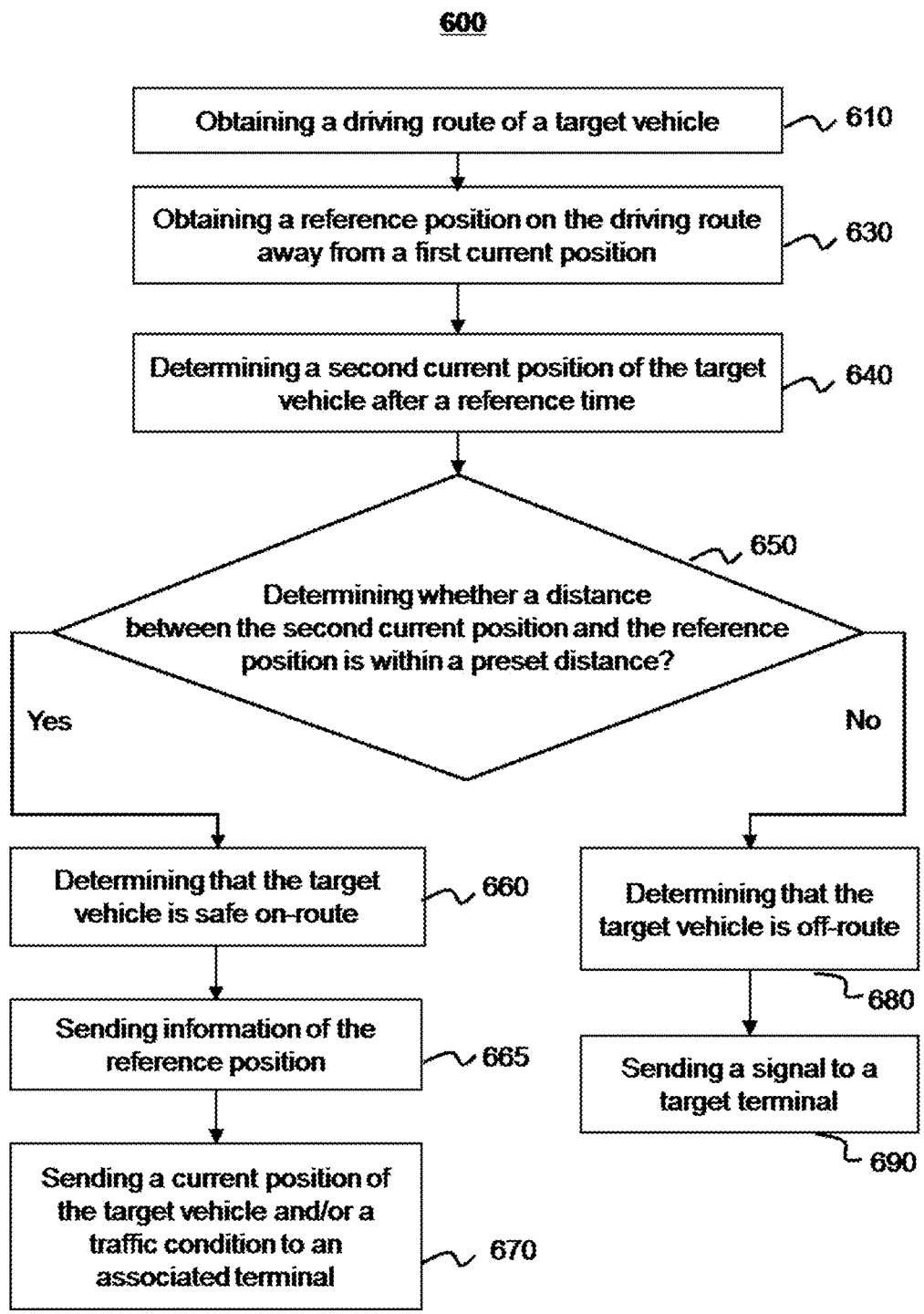
FIG. 6 is a flowchart of an exemplary method and/or process for monitoring a target vehicle according to some embodiments of the present disclosure.

FIG. 6 is a flowchart of an exemplary method and/or process for monitoring a target vehicle according to some embodiments of the present disclosure. The process and/or method may be operated by a computer server (e.g., the server 110) of an online transportation service platform of the on-demand service system 100. For example, the method and/or process may be implemented as a set of instructions and stored in at least one storage medium of the online transportation service platform. At least one processor of a computer server of the platform may communicate with the storage medium and execute the set of instructions to perform the following steps.

In step 610, the computer server may obtain a driving route of the target vehicle.

The target vehicle may be a vehicle that accepts the transportation service request. It may include car, freight car, rail vehicle, Sports Utility Vehicle (SUV), Unmanned Aerial Vehicle (UAV), Unmanned Ground Vehicle (UGV), or the like. The target vehicle may be taking a passenger, a driver, and/or goods. In some embodiments, the target vehicle may go forward along a driving route. In some embodiments, the target vehicle may deviate from a predetermined driving route.

The driving route may start from a departure position and end at a destination position. The driving route may be determined based on the departure information and destination information of the target vehicle. In some embodiments, the driving route may be a route with a relatively short driving time, a relatively short driving distance. In some embodiments, the driving route may be a route avoiding road congestion.

In some embodiments, the driving route may include one or more intermediate points. The intermediate point(s) may be position(s) the vehicle may pass by as demanded by a passenger, a driver, a goods owner, or the like. Further, the intermediate point(s) may be predetermined or partially predetermined by the online transportation service platform. In some embodiments, the one or more intermediate points may be one or more points of interests (POIs). For example, a tourist may wish the driving route to pass through one or more tourist attractions. In some embodiments, an intermediate point may be a location where the passenger wish to stop by, to meet with someone or pick up a package, for example.

The driving route may be predetermined based on the departure position, the destination position, the POI(s) (if any), and/or the intermediate point(s) (if any), or the like, or any combination thereof. For example, a passenger may input departure information, destination information, POI(s), and/or intermediate point(s) through a user terminal when the passenger sends a service request to the computer server. The computer server may generate one or more driving routes accordingly. In some embodiments, the driving route(s) may be closed loop(s). For example, when the transportation service requestor is a tourist and plans to depart from his/her hotel for sightseeing and returns to the same hotel, the driving route of the transportation service may be a closed loop. In this scenario, the departure position and the destination position may be the same. When the driving route includes a POI, the driving route may be regarded as a POI driving route.

In some embodiments, the computer sever may obtain two or more driving routes based on the departure information and destination information of the passenger. The computer server may deliver an optimal driving route including a plurality of POIs to the passenger terminal and/or the driver terminal on the target vehicle. In some embodiments, the driving route of the driver may be in accordance with the driving route of the passenger.

In step 630, the computer server may obtain a reference position on the driving route. In some embodiments, the reference position may be a fixed position on the driving route. The reference position may refer to a position on the driving route where the target vehicle may arrive after a proper time period. In some embodiments, the reference position may be a predetermined position on the driving route, such as, the POI, the intermediate point, or the like, or any combination thereof. In some embodiments, when the reference position is predetermined, the driving route may be obtained based on the reference position in step 610. That is to say, when the reference position is predetermined based on a POI, an intermediate point, or the like, the driving route may be obtained based on the reference position, the departure information, and the destination information of the driving route.

In some embodiments, the reference position may be dynamically determined based on a first current position of the target vehicle, and the driving route. To this end, the computer server may determine a first current position of the target vehicle, and then based on the first current position, determine the reference position. The first current position of the target vehicle may be a real-time position of the target vehicle at a first time point. In some embodiments, the computer server may store a current position of a user terminal as the real-time position of the target vehicle. Here, the user terminal may be associated with at least one of a party (e.g., a driver or a passenger) of the transportation service transaction in the target vehicle. In some embodiments, the computer server may obtain a first current position of the user terminal of the driver and/or passenger based on an instruction of the online transportation service platform. In some embodiments, the computer server may determine the first current position via a global position system (GPS) mounted in the target vehicle.

The reference position may be estimated based on one or more factors including, for example, a current speed of the vehicle, a current acceleration of the vehicle, a current traffic condition of the first current position, or the like, or any combination thereof. The traffic condition may include a degree of the traffic jam, a number of the vehicles, and a situation of traffic light. The computer server may obtain the traffic condition of the first current position from the database 150, or a database of the computer server, or from other application(s) of application software.

In some embodiments, the reference position may be determined based on a reference time and/or a reference distance. For example, the reference time may be set as five minutes, and the second current position of the target vehicle may be the position the target vehicle arrived after driving from the first current position for five minutes. The reference distance may be set depending on the situation, such as 50 meters, 100 meters, 1000 meters, and so on. For example, the reference position of the target vehicle may be the position the target vehicle arrived after driving 200 meters. As another example, the reference distance may be set as one hundred meters, and the second current position of the target vehicle may be the position the target vehicle arrived after driving from the first current position for one hundred meters. The scope of the present disclosure may be not intended to limit the specific value of the reference time and/or the reference distance.

In some embodiments, there may be more than one driving route between the departure and the destination. Therefore, there may be multiple reference positions after the target vehicle driving for the reference time and/or the reference distance. Meanwhile, the multiple reference positions may be determined based on the multiple driving routes. For example, each reference position may be determined on each driving route.

In step 640, the computer server may determine a second current position of the target vehicle after a reference time or a reference distance. In some embodiments, the second current position of the target vehicle may be a real-time position of the target vehicle after driving for the reference time and/or the reference distance. The determination of the second current position may be similar with that of the first current position. For example, the computer server may store a current position of a user terminal as the second current position of the target vehicle. Wherein, the user terminal may be associated with at least one of a party (e.g., a driver or a passenger) in the target vehicle. As another example, the computer server may obtain a second current position of the user terminal of the driver and/or passenger based on an instruction of the online transportation service platform. As still another example, the computer server may determine the second current position via a global position system (GPS) mounted in the target vehicle.

In step 650, the computer server may determine whether a distance between the second current position and the reference position is within a preset distance. The preset distance may be a reasonable distance between the second current position and the reference position. In some embodiments, the second current position of the target vehicle may be far from the reference position. For example, the target vehicle may be caught in a traffic jam and may not reach a position around the reference position within the reference time.

When the computer serve determines that the distance between the second current position and the reference position is within the preset distance, in step 660, the computer server may determine that the target vehicle is safe on-route. In some embodiments, the distance between the second current position and the reference position may be shorter than the preset distance. For example, the second current position may be same as the reference position. It may be indicated that the target vehicle is running in a predetermined driving route (e.g., the driving route obtained in step 610), i.e., the target vehicle may be in a safe state.

In step 665, the computer server may send information of the reference position, so that the party that initiate the safe mode may be notified that the vehicle is on-route. For example, if the driver initiates the safe mode, and/or if the driver sets the reference position in the driving route, when the target vehicle approaches and/or passes by the reference position, the computer server may notify the driver, by sending the name of the reference position, that the vehicle is navigating along the route as planned. As a result, it may be unnecessary for the driver to watch a GPS screen in order to identify whether he/she is on-route.

As another example, if the passenger initiates the safe mode, and/or if the passenger sets the reference position in the driving route, when the target vehicle approaches and/or passes by the reference position, the computer server may notify the passenger, by sending the name of the reference position, that the vehicle is navigating along the route as planned. As a further example, if the reference position is a POI for a tourist, when the target vehicle approaches and/or passes by the POI, the computer server may send the name and related information of the POI.

In some embodiments, the computer server may even determine whether there is a POI near the second current position in the driving route. If the answer is yes, the computer server may send an audio indication to a user terminal of a driver and/or a passenger, or a player of the target vehicle. In some embodiments, information sent may include the second current position, the distance between the second current position to a next POI, the POI name, the direction the target vehicle is moving toward, whether the direction is to be changed, or the like, or any combination thereof. In some embodiments, the user terminal may broadcast the driving route. When a driver is driving a vehicle, he/she may observe driving route in visible region on a user interface of a driver terminal and/or hear a broadcast of the POI driving route. It should be noted that step 665 may be performed before, after, or at the same time with any step of step 630 through step 690.

In step 670, the computer server may send a current position of the target vehicle and/or a traffic condition of the current position to an associated terminal. In some embodiments, the computer server may send a next reference position to the associated terminal. The associated terminal may be a terminal associated with a user terminal of the driver or passenger on the target vehicle. A person may understand the travel condition of the target vehicle via the associated terminal. The person may be a guardian, a relative, a friend, or the like of the driver or passenger on the target vehicle. In some embodiments, the associated terminal may be a terminal associated with the target vehicle. For example, the target vehicle may be an unmanned vehicle, a manager or owner of the unmanned vehicle may understand the travel condition of the target vehicle via the associated terminal. In some embodiments, the computer server may send the information mentioned above to the associated terminal at periodic intervals. In some embodiments, the associated terminal may acquire the information automatically at periodic intervals or any time of need.

When the computer serve determines that the distance between the second current position and the reference position is not within the preset distance, in step 680, the computer server may determine that the target vehicle is off-route. In some embodiments, when the target vehicle is off-route, the computer server may determine that an emergency associated with the target vehicle may occur. For example, the target vehicle may be at a risk of traffic accident. As another example, the target vehicle may be hijacked by a driver or passenger on it. In some embodiments, an occurrence of the emergency may be initiated by the passenger terminal/driver terminal based on the reminding of the target vehicle is off-route.

In step 690, the computer server may send a signal to a target terminal.

The target terminal may refer to a terminal related to the target vehicle, including, for example, a vehicle terminal, a user terminal, a third party terminal, a predefined platform, a data center (e.g., a public security bureau data center, or a police station), or the like, or any combination thereof. The vehicle terminal may be associated with a manager, or an owner of the target vehicle. In some embodiments, the user terminal may include a driver terminal (e.g., a driver on the target vehicle), and/or a passenger terminal (e.g., a passenger on the target vehicle), and/or a terminal of the party who initiates the safe mode. In some embodiments, the third party terminal may be associated with the user terminal. The third party may associated with a predefined terminal, for example, a relative, a guardian, or a friend of a user of the user terminal. In some embodiments, the third party terminal may be one or more terminals around the current position of the target vehicle. The third party terminal may acquire the signal reminding that the target vehicle is off-route.

The signal may include information related to the target vehicle, including, for example, a current position of the target vehicle, a current traffic condition of the current position, a reference position, a current time, a difference between the current position and the reference position, a driving route of the target vehicle, identity information of a driver or passenger, a photo of the driver or passenger, identification information of the target vehicle (e.g., a license plate of the target vehicle, an image of the target vehicle, a vehicle type, vehicle age, a working condition of the target vehicle, a color of the target vehicle, etc.), or the like, or any combination thereof. In some embodiments, the signal may include an instruction for a driver, passenger, or a predefined third party to take action(s). In some embodiments, an occurrence of an emergency associated with the target vehicle may be determined based on the signal.

In some embodiments, the computer server may automatically send the signal to the target terminal. The signal may be sent in a form of a message, call, command, or the like, or any combination thereof. Accordingly, the target terminal may receive the signal and present the corresponding information as a message, vibration, sound, flicker, or the like, or any combination thereof. For example, the signal may be a voice message from a driver or passenger on the target vehicle. In some embodiments, the voice message may be transmitted via a communication connection (e.g., via the network 120) between the user terminal and a third party terminal. The computer server may make a real-time voice call to establish the communication connection between the driver or passenger and the third party. Such that the third party may ensure the secure state of the driver or passenger on the target vehicle based on the real-time voice call.

In some embodiments, the computer server may send one or more instructions to the user terminal to remind the driver or passenger on the target vehicle that the vehicle may be off-route. The instruction(s) may guide the driver or passenger to self-rescue or call for help. For example, the user terminal may display a graphical user interface (GUI) for the driver or passenger to release call for help. The driver or passenger may trigger an emergency button on the GUI. In some embodiments, a party (e.g., the driver or passenger) of the transportation transaction may initiate the safe mode before, after, or at the same time with any step of step 610 through step 690, and the party may call for help according to the instructions. In some embodiments, upon releasing call for help, the user terminal may transmit emergency information to a target terminal (e.g., a third party terminal, a predefined platform, a public security bureau data center, or the like, or any combination thereof). In some embodiments, upon releasing call for help, the user terminal may transmit emergency information to the computer server, and the computer server may send a signal to the target terminal.

Merely by way of example, the user of the user terminal may be a passenger. The passenger may be aged, child, pregnant, handicapped, or the like. In order to ensure the safety and achieve safety monitoring of the passenger, the computer server may send the traffic condition and the driving route of the target vehicle associated with the passenger terminal to the target terminal. As another example, the user of the user terminal may be a driver. In order to ensure the safety and achieve safety monitoring of the driver, the computer server may send the traffic condition and the driving route of the target vehicle associated with the driver terminal to the target terminal.

It should be noted that in some embodiments, before step 650, the user terminal may automatically send a real-time position to the computer server in real time. The computer server may obtain the real-time position of the user terminal and determine whether the target vehicle associated with the user terminal is running on a predetermined driving route. Such that the monitoring of the target vehicle may be achieved effectively, in order to ensure the safety of a user of the user terminal.

In some embodiments, the computer server may obtain several driving routes of the target vehicle from the departure position to the destination position. In some embodiments, the computer server may obtain several reference positions on corresponding driving routes. In some embodiments, the computer server may monitor the target vehicle to determine whether the target vehicle is on-route or off-route. The computer server may determine whether the distance between a location where the target vehicle is about to arrive (e.g., a second current position illustrated in FIG. 6) and the reference position is within a preset distance. As illustrated below, the detailed situation of the several driving routes may be described in FIG. 7.

Figure 7:
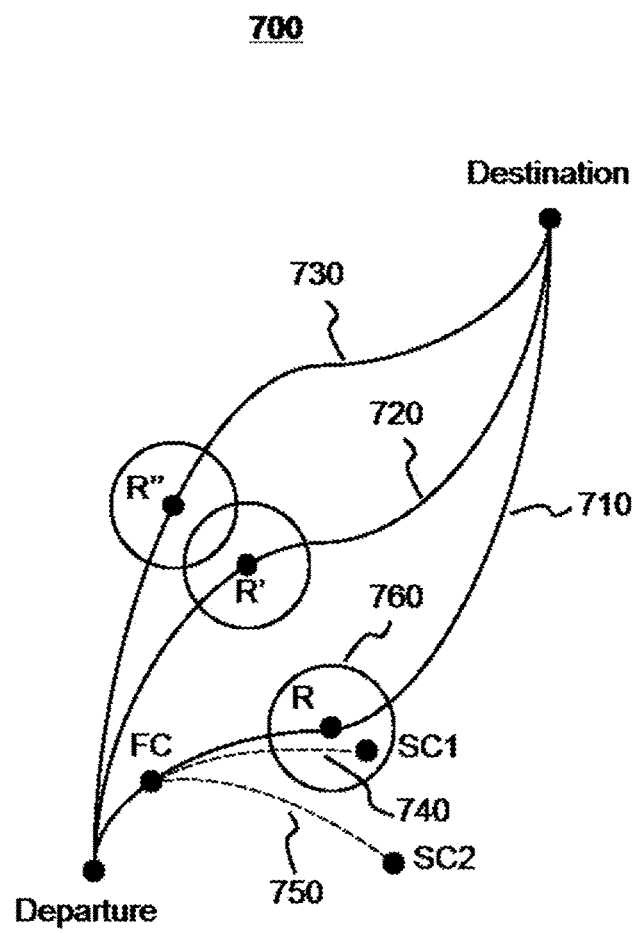
FIG. 7 is a schematic diagram illustrating exemplary driving routes and reference positions according to some embodiments of the present disclosure.

FIG. 7 is a schematic diagram illustrating exemplary driving routes and reference positions according to some embodiments of the present disclosure. The schematic diagram in FIG. 7 is merely for illustration and the scope of the present disclosure does not intend to limit the driving route. In some embodiments, the driving route is a closed loop. For example, the departure and the destination may refer to a same position. As another example, the distance between the departure and the destination may be less than a preset value.

In FIG. 7, there are three driving routes from the departure position to the destination position, i.e., a first driving route 710, a second driving route 720, and a third driving route 730. Wherein, there are three reference positions on the three driving routes respectively, i.e., a reference position R on the first driving route 710, a reference position R' on the second driving route 720, and a reference position R" on the third driving route 730. The reference positions R, R', and R" are shown merely for illustration purposes, and other reference positions (not shown) may be distributed on different positions of the first driving route 710, the second driving route 720, and/or the third driving route 730.

In some embodiments, one or more of the reference positions R, R', and R" may be intermediate points the target vehicle wishes to pass by. The computer server may determine the first driving route 710, the second driving route 720, and/or the third driving route 730 based on one or more of the reference positions R, R', and R". In some embodiments, the first driving route 710, the second driving route 720, and/or the third driving route 730 may be driving routes predetermined by the computer server. The computer server may dynamically determine one or more of the reference positions R, R', and R" based on one or more of the first driving route 710, the second driving route 720, and the third driving route 730.

Merely by way of example, a first current position FC of the target vehicle may be determined on the first driving route 710 via a global position system (GPS). The reference positions R, R', and R" may be positions the target vehicle may arrive at after a reference time period or reference distance.

In one example, the computer server may monitor an actual driving route 740 from the first current position FC to a second current position SC1. In some embodiments, the second current position SC1 may be the position the target vehicle actually arrived after driving from the first current position FC for the reference time (e.g., five minutes) and/or the reference distance. The computer server may determine a distance between the second current position SC1 and the reference position R on the first driving route 710 is within a preset distance. In some embodiments, a circle region 760 may be centered on the reference position R. The circle region 760 may include a plurality of positions whose distance from the reference position R is within the preset distance. As shown in FIG. 7, the second current position SC1 within the circle region 760 may indicate that the target vehicle is on-route.

In another example, the computer server may monitor an actual driving route 750 from the first current position FC to a second current position SC2. In some embodiments, the second current position SC2 may be the position the target vehicle actually arrived after driving from the first current position FC for the reference time and/or the reference distance (e.g., five hundred meters). The computer server may determine a distance between the second current position SC2 and the reference position R on the first driving route 710 is not within a preset distance. As shown in FIG. 7, the second current position SC2 beyond the circle region 760 may indicate that the target vehicle is off-route.

In some embodiments, emergency may occur to one or more parties (e.g., the driver and/or passenger) of the transportation transaction even when the target vehicle is determined to be safe on-route. To secure the safety of a party (e.g., the driver or passenger), the computer server may monitor a user terminal of the party to determine whether there is an occurrence of an emergency. In some embodiments, the party may automatically send emergency information to call for help. As illustrated below, the detailed process may be described in FIG. 8.

Figure 8:
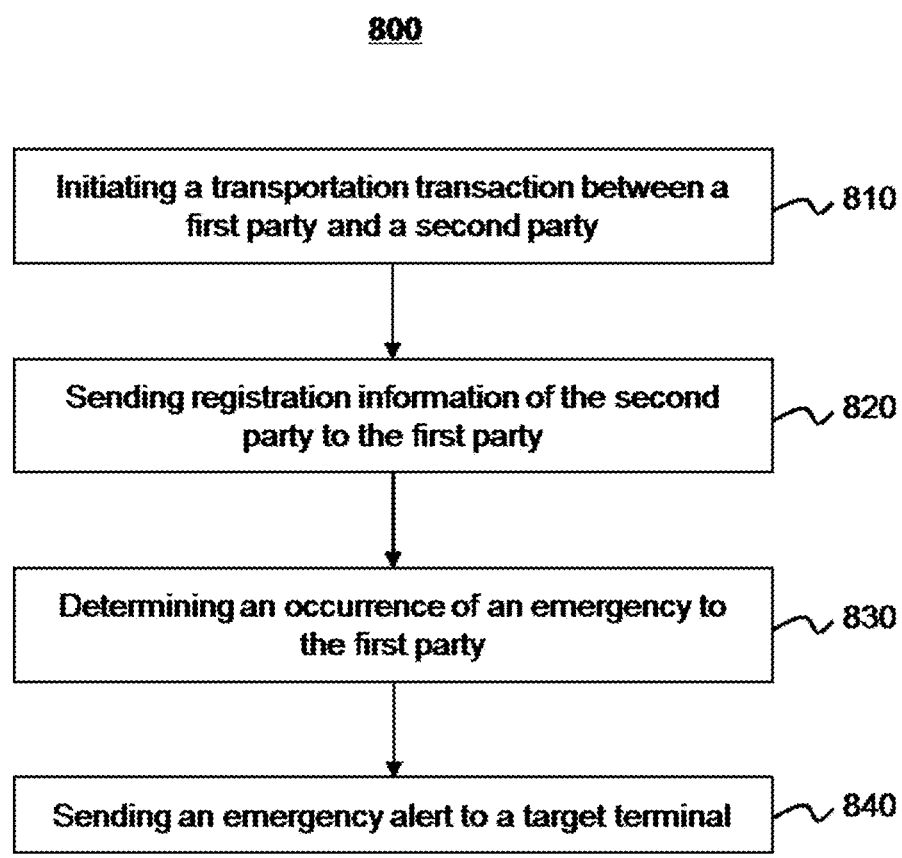
FIG. 8 is a flowchart of an exemplary method and/or process for sending emergency information according to some embodiments of the present disclosure.

FIG. 8 is a flowchart of an exemplary method and/or process for sending emergency information according to some embodiments of the present disclosure. The process and/or method may be operated by a computer server (e.g., the server 110) of an online transportation service platform of the on-demand service system 100. For example, the method and/or process may be implemented as a set of instructions and stored in at least one storage medium of the online transportation service platform. At least one processor of a computer server of the platform may communicate with the storage medium and execute the set of instructions to perform the following steps.

In step 810, the computer server may initiate a transportation transaction between a first party and a second party. The first party and the second party may access the online transportation service platform. The transportation transaction may include a freightage transaction, a taxi reservation, a tourist coach transaction, or the like. The first party may access the online transportation platform via a first user terminal. The second party may access the online transportation platform via a second user terminal. The first party may be the driver terminal and/or the vehicle terminal, the second party may be the passenger terminal, or vice versa.

In some embodiments, when the first user terminal is the passenger terminal, the passenger may use the passenger terminal to access the online transportation service platform and input travel information, such as the departure information and destination information, or the like. The first user terminal may be an electronic device associated with the passenger of the vehicle. The second user terminal may be the driver terminal. The driver may use the driver terminal to access the online transportation service platform. The second user terminal may be an electronic device associated with the driver of the vehicle.

The computer server may obtain transaction information. The transaction information may include information regarding the service request, for example, the departure information, the destination information, or the like, or any combination thereof. The transaction information may include information regarding the first party, for example, a current position of the first party, registration information of the first party, or the like, or any combination thereof. The transaction information may include information regarding the second party, for example, a current position of the second party, registration information of the second party, or the like, or any combination thereof. The transaction information may be obtained from the first party, the second party, and/or a predetermined database (e.g., the database 150) that stores the information.

In some embodiments, the transportation transaction may be established based on an order-dispatch mode or an order-request mode. In order-dispatch mode, the computer server may dispatch a transportation order to one of multiple driver terminals. In order-request mode, the computer server may send the transportation order to the multiple driver terminals, and the multiple driver terminals may respond for the transportation order.

In order-dispatch mode, the transaction information associated with the registration information of the second party may be generated after the computer server dispatches the transaction order to the second party. In order-request mode, transaction information associated with the registration information of the second party may be generated when or after the second party accepts the transaction order. The scope of the present disclosure may be not intend to limit the mode of the transaction order allocation, such as the order-dispatch mode and/or the order-request mode.

In some embodiments, when or after the transportation transaction is initiated, the second party may be beyond a visible range of the first party. The computer server may send the current position of the second party to the first party to facilitate the first party to find the second party, or vice versa. For example, the computer server may send the current position of the passenger to the driver, thus the driver may drive to the current position of the passenger and pickup the passenger. As another example, the computer server may send the current position of the driver to the passenger, thus the passenger may walk to the current position of the driver and get in the vehicle.

In step 820, the computer server may send registration information of the second party to the first party. The registration information of the second party may include registered identification information of the vehicle (e.g., a registration license plate of the vehicle, a registration image of the vehicle, a registration vehicle type, registration vehicle age, a registration working condition of the vehicle, a registration color of the vehicle, etc.), driver identity information of the vehicle, an image of the vehicle, a phone number of the driver, or the like, or any combination thereof. In some embodiments, the computer server may acquire the registered identification information of the vehicle (e.g., the registration license plate of the vehicle) from the registration information. When the computer server sends registration information of the second party, the first party may receive the registration information, and the first user terminal may display the registration information. The first user may determine whether the registration information is consistent with the actual information of the vehicle and/or the second party. In some embodiments, the computer server may send a reminder to the first party, and the first party may obtain the reminder. The reminder may remind the first party to confirm whether the registered identification information of the vehicle is consistent with the actual information the first party observes.

In some embodiments, the first party may obtain the reminder before getting into the vehicle. When the actual information (e.g., the actual license plate) of the vehicle is inconsistent with the registered identification information (e.g., the registration license plate) of the vehicle, the first party (e.g., the passenger) may refuse to get into the vehicle. In some embodiments, before driving, the passenger terminal may obtain a photo of the second party (e.g., a driver photo) and send the photo to the computer server. In some embodiments, the driver terminal may take a photo of the driver by invoking a camera program before billing the transaction. The computer server may generate a reminder after receiving the photo and send the reminder to the driver terminal. The driver terminal may receive, from the computer server, and display the reminder indicating that the transaction may be monitored. For example, the driver terminal may display the reminder in a prompt box indicating that "The XX Public Security Bureau (PSB) has recorded the transportation transaction". Wherein, the XX Public Security Bureau (PSB) may be a legal jurisdiction of the transportation transaction. Thus, the security risks of taking a vehicle associated with fake identification information (e.g., fake license plate) may be avoided, and the safety of the passenger may be improved.

In some embodiments, the passenger may take an image of the vehicle in real time and send the image of the vehicle to the computer server. The computer server may generate a reminder based on the uploaded image of the vehicle and send the reminder to the driver terminal and/or vehicle terminal. The reminder may remind the driver that the image of the vehicle has been taken and uploaded. The reminder may remind the driver that the vehicle has been monitored, or is to be monitored. The driver terminal and/or vehicle terminal may display the reminder. In some embodiments, the reminder may dispel criminal motive of the driver associated with the vehicle terminal. In some embodiments, the computer server may save the vehicle image and send the vehicle image to one or more target terminals in case of an occurrence of an emergency. The vehicle image may help the target terminal(s) to look for the vehicle to rescue the passenger.

In some embodiments, when the first user terminal is an electronic device associated with a driver of a vehicle, the second user terminal may be an electronic device associated with a passenger of the vehicle. The registration information of the second party may include identity information of the passenger, a phone number of the passenger, a photo of the passenger, or the like, or any combination thereof. The registration information of the second user terminal may be sent to the first user terminal.

In step 830, the computer server may determine an occurrence of an emergency to the first party. The occurrence of the emergency to the first party may be initiated by the first party. The emergency information may include a position of the occurrence of the emergency, registration information of the second party, or the like, or any combination thereof.

In some embodiments, the first user terminal may display a user interface with an emergency alert. In some embodiments, the first user may choose to open the user interface with the emergency alert on the first user terminal according to one or more instructions displayed on the first user terminal. In some embodiments, the first user terminal may display the user interface with the emergency alert as a system default after the transportation transaction is initiated. In some embodiments, the first user may switch between the user interface with the emergency alert and other interface(s). An alert button may be configured to cause the first party to send an emergency confirmation signal when the alert button is activated. When the alert button is activated (e.g., being pressed by the first party), the computer server may determine an occurrence of an emergency to the first party is confirmed. Meanwhile, the first user terminal may send emergency information to the computer server, and the computer server may receive the emergency information. The emergency information may include the location of the occurrence of the emergency, the time of the occurrence of the emergency, registration information of the first party, registration information of the second party, the registered identification information (e.g., the registration license plate) of the vehicle, or the like, or any combination thereof. The location of the occurrence of the emergency may be a current location of the first user terminal, a current location of the second user terminal, a current location of the vehicle terminal, or the like.

In step 840, the computer server may send an emergency alert to a target terminal. The emergency alert may include the emergency information. The target terminal may be at least one of a third party terminal, a predefined platform, and a public security bureau data center, or the like, or any combination thereof. The third party terminal may be a default terminal or may be preset by the user of the terminal that confirmed the emergency. The computer server may send the emergency alert to the target terminal based on the reception of the emergency confirmation signal from the first user terminal.

Merely by way of example, when the first party is the passenger terminal, the passenger may ask for help via clicking the alert button set on a user interface of the passenger terminal. When the passenger perceives the danger, the passenger may click the alert button in order to send the registered identification information (e.g., the registration license plate) of the vehicle, the location of the occurrence of the emergency to the computer server and/or the public security bureau data center. The computer server may acquire multiple terminals in a preset region around the location of the occurrence of the emergency and send the emergency information to the multiple terminals. When the alert button is activated, the computer server may accept the emergency information from the passenger terminal and send the emergency information to the multiple terminals. A distance between the multiple terminals and the location of the occurrence of the emergency may be shorter than a preset value. Thereby the computer server may assist the passenger by asking the drivers and/or passengers associated with the multiple terminals for help. In some embodiments, the multiple terminals may receive the emergency information and confirm to join the rescue action. The vehicle terminals associated with the multiple terminals may enable navigation to drive to the location of the occurrence of the emergency. Thus the passenger may get support based on the alert button, and the safety of the passenger taking the vehicle may be improved.

In some embodiments, when the first party is the passenger terminal, the second party may be an unmanned vehicle, the passenger may activate the alert button on a user interface of the passenger terminal in case of emergency. When the alert button is activated, the unmanned vehicle may take actions, including, for example, send a signal, ring a warning siren, or take an emergency brake, or the like, or any combination thereof.

As another example, when the first party is the driver terminal, the driver may ask for help via clicking the alert button set on a user interface of the driver terminal. The emergency information may further include identity information of the passenger. When the alert button is activated, the computer server may receive the emergency information from the driver terminal and send the emergency information to a target terminal. The emergency information may include the registered identification information (e.g., the registration license plate) of the vehicle, the location of the occurrence of the emergency, the identity information of the passenger, or the like, or any combination thereof. The location of the occurrence of the emergency may be the location of the driver terminal when the alert button is activated. In addition, the identity information of the passenger may include a name, contact information, a photo of the passenger, or the like, or any combination thereof. It may be easy to find the passenger when the safety of the driver is under threat of the passenger. When the driver perceives danger, the driver may click the alert button in order to send the registered identification information (e.g., the registration license plate) of the vehicle, the location of the occurrence of the emergency, or the like to the computer server and/or the public security bureau data center. The driver may get support based on the alter button, and the safety of the driver may be improved.

In some embodiments, the passenger may send a message to a preset contacts before an occurrence of an emergency. The message may include information regarding the registered identification information (e.g., the registration license plate) of the vehicle, a real-time position of the vehicle, a photo of the driver, a vehicle image, or the like, or any combination thereof. To further improve the safety of the passenger and dispel criminal motive of the driver, the passenger may send the message to the preset contacts via the passenger terminal during the driving process. In some embodiments, the passenger may preset contacts and/or select contacts according to the need. The passenger terminal may send the message to the preset contacts in a form of HTML5 link associated with the registered identification information (e.g., the registration license plate) of the vehicle and/or the real-time position of the vehicle. The preset contacts (e.g., a target terminal) may obtain the message and click the HTML5 link to check the real-time position of the vehicle associated with the passenger.

It should be noted that in some embodiments, step 830 and step 840 may be not necessary. Alternatively, upon confirming an occurrence of an emergency, the first user terminal may automatically send the emergency alert to one or more target terminals without sending an emergency confirmation signal to the computer server. For example, when the first party perceives the danger, the first party may click the alert button shown in a user interface of the first user terminal, then the first user terminal may send the emergency information (e.g., registered identification information of the vehicle, the location of the occurrence of the emergency, etc.) to the target terminal(s).

In some embodiments, one or more parties of the transportation transaction may follow one or more instructions to call for help, and/or cancel for help. The instruction(s) may be displayed on a user interface of an application installed in a user terminal. In some embodiments, displaying of the instruction(s) may be booted by the computer server. Alternatively, the party may automatically invoke the user interface to display the instruction(s). As illustrated below, the details of the instruction(s) may be described in FIG. 9-A through FIG. 9-C.

FIG. 9-A is a primary view of an exemplary user interface of the online transportation service platform for displaying alert tutorial information according to some embodiments of the present disclosure. As shown in FIG. 9-A, the interface may display a gray mask layer, and upon the gray mask layer may display a prompt box of the alert tutorial information. The alert tutorial information may prompt the user to shake the user terminal (i.e., smartphone) in case of emergency during a traveling route of the transportation service. When the user shakes the user terminal, the interface may jump to an interface of an alert button, as shown in FIG. 9-B.

FIG. 9-B is a variation diagram of an exemplary user interface displaying an alert button according to some embodiments of the present disclosure. The upper section of the interface may be a display area showing prompt information corresponding to the alert, and the lower section of the interface may display the alert button. In some embodiments, the interface may display a warning message to remind the party not to trigger the alert button in a non-emergency situation. In emergency situation, when the party clicks the alert button, the interface may jump to an interface displaying online help information, as shown in FIG. 9-C.

FIG. 9-C is a variation diagram of an exemplary user interface displaying online help information according to some embodiments of the present disclosure. The upper section of the interface may be a display area showing help mode options. When the party selects one of the help mode options, the user terminal may transmit the travelling information, and/or emergency information corresponding to the user to a target terminal. Wherein, the target terminal may be predetermined by the party or selected by the party in the help mode options, i.e., the user may ask a third party associated with the target terminal for help. In some embodiments, the user interface may provide a function of cancelling for help for the party. The lower section of the interface may display a cancel button. When the user clicks the cancel button, the user may cancel the request of asking for help.

In some embodiments, the computer server may send a driving route to a first party and/or a second party of a transportation transaction when a target vehicle is driving from the departure position to the destination position. In some embodiments, the computer server may send a driving route to a driver terminal when the driver is driving the target vehicle to a pickup position to pickup a passenger. In some embodiments, the driver terminal may broadcast the driving route to the driver. Therefore, one or more parties may listen to a broadcast to confirm that he or she may be on-route without watching a navigation route displayed on a user interface of an application installed in a user terminal. As illustrated below, the detailed process may be described in FIG. 10.

Figure 10:
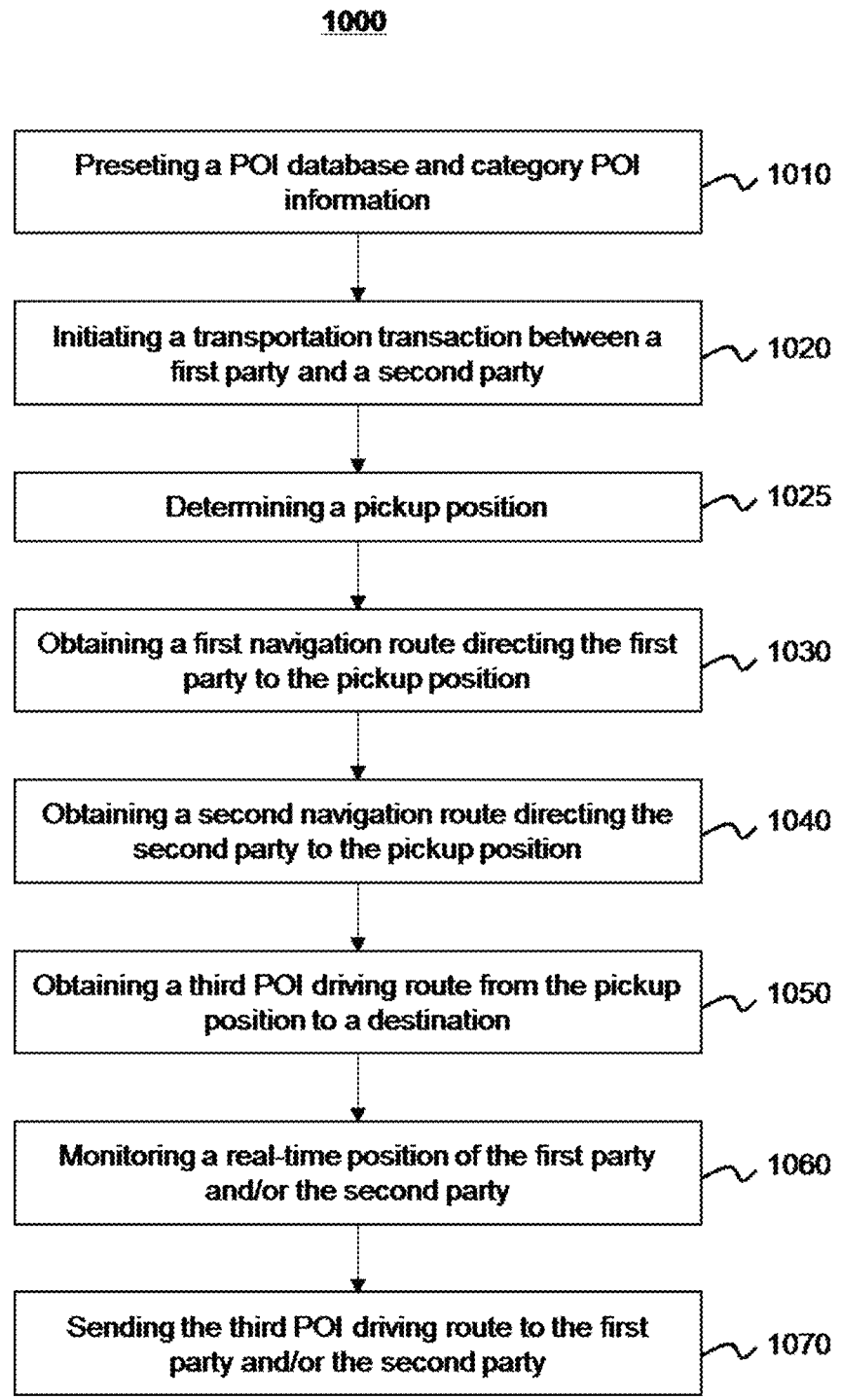
FIG. 10 is a flowchart of an exemplary method and/or process for sending a POI driving route to a first party and/or a second party according to some embodiments of the present disclosure.

FIG. 10 is a flowchart of an exemplary method and/or process for sending a POI driving route to a first party and/or a second party according to some embodiments of the present disclosure. The process and/or method may be operated by a computer server (e.g., the server 110) of an online transportation service platform of the on-demand service system 100. For example, the method and/or process may be implemented as a set of instructions and stored in at least one storage medium of the platform. At least one processor of a computer server of the platform may communicate with the storage medium and execute the set of instructions to perform the following steps.

In step 1010, the computer server may preset a POI database and category POI information. The POI database may include one or more POIs. A POI may refer to a point of interest including a building or a road, for example, a shopping mall, a park, a school, a hospital, a hotel, a restaurant, a supermarket, a tourist attraction, a landmark, or the like, or any combination thereof. Each POI may have corresponding POI information. The POI information of a POI may refer to information regarding the POI, including, for example, a POI name, a POI position, a POI orientation, or the like, or any combination thereof. Merely by way of example, in New York City, a POI name may be Times Square, a POI position may be the geographical location of Times Square, a POI orientation may be the south of Times Square.

In some embodiments, the computer server may obtain the POI information within a proper range, for example, a block, a city, a district, a country, or the like, or any combination thereof. The POI information may be obtained by manual collection, package upload, street view collection, satellite data collection, or the like, or any combination thereof. In some embodiments, the computer server may update the POI information based on terminal (e.g., the requestor terminal 130, the provider terminal 140, etc.) feedback information. The computer server may preset a POI database based on the POI information obtained. The POI database may include POI information of one or more POIs.

In some embodiments, the computer server may category POI information in the POI database. The computer server may category POI information based on a road direction. A road may have two directions. Along different directions of the road, there may have different POI information. In some embodiments, POI information along the same direction of the road may be regarded as the same category. In some embodiments, there may exist several POIs in a road, but the POI information may be distinct in different forward direction. For example, there may be five POIs named A, B, C, D, and E in a road extending along north-south direction. When the forward direction of the driver is from the north to the south, the POI may be A, B, and D within a visible range of the driver on one side of the road (e.g., on the right side of the forward direction, i.e., the west side of the road); when the forward direction of the driver is from the south to the north in the same road, the POI may be C and E within a visible range of the driver on the other side of the road (e.g., on the right side of the forward direction, i.e., the east side of the road). In some embodiments, a POI orientation may include a doorway of a POI, a corner of a POI, one side of the driver forward direction, an opposite side of the driver forward direction, a diagonally opposite position of a POI, or the like, or any combination thereof. For example, Peking university east gate, Zhong guancun square north side, or the like.

In step 1020, the computer server may initiate a transportation transaction between a first party and a second party. The first party and/or the second party may be one of the parties mentioned above. For example, the first party may be a passenger, and the second party may be a driver. The computer server may initiate the transportation transaction based on a service request sent from the passenger. The service request may include a desired departure position and a destination position.

In step 1025, the computer server may determine a pick up position. In some embodiments, the computer server may determine the pickup position as the desired departure position of the passenger, a current position of the passenger, a current position of the driver, or the like. In some embodiments, the pickup position may be determined as a POI within a predetermined range (e.g., the nearest POI) of the desired departure position of the passenger, the current position of the passenger, the current position of the driver, or the like. In some embodiments, the POI information of the nearest POI may be specific enough to direct the first party and/or the second party to the pickup position. Otherwise, it may have bad influence on the passenger experience, cause the withdrawal of the transportation transaction, or reduce the income of a driver. In some embodiments, the pickup position may include the POI information, for example, a name of the POI, a position coordinate of the POI, an orientation corresponding to the POI, or the like, or any combination thereof.

In step 1030, the computer server may obtain a first navigation route directing the first party (e.g., a passenger) to the pickup position. In some embodiments, the first navigation route may be a route from the departure position of the passenger or the current position of the passenger to the pickup position. In some embodiments, the first navigation route may be a route with a relatively short walking distance, or a relatively short walking time. The computer server may send the first navigation route to a user terminal of the first party. The user terminal of the first party may display the first navigation route, and the first navigation route may guide the first party to the pickup position.

In step 1040, the computer server may obtain a second navigation route directing the second party (e.g., a driver) to the pickup position. In some embodiments, the second navigation route may be a route from the current position of the driver to the pickup position. In some embodiments, the second navigation route may be a route with a relatively short driving time, a relatively short driving distance. In some embodiments, the second navigation route may be a route avoiding road congestion. The computer server may deliver the second navigation route to a user terminal of the second party. The user terminal of the second party may display the second navigation route, and the second navigation route may guide the second party to the pickup position.

In some embodiments, the first (or second) navigation route may have one or more POIs different from the pickup position. When the first (or second) party goes forward along the first (or second) navigation route, the computer server may send information regarding the POI(s) name, whether need to change direction, and/or when to change direction to the first (or second) party. In some embodiments, the user terminal associated with the first (or second) party may broadcast the navigation route. Thus, the first (or second) party may not need to watch the driving route shown in the user terminal.

In step 1050, the computer server may obtain a third POI driving route directing the second party (e.g., the driver) to the destination position. A POI driving route may include one or more POIs. In some embodiments, the third POI driving route may be a route from a current position of the driver to the destination position. In some embodiments, the third POI driving route may be a route from the pickup position to the destination position. In some embodiments, the first party and/or the second party may change the destination position of the transportation transaction, and the computer server may update the third POI driving route based on the changed destination position. In some embodiments, the computer serve may send the third POI driving route to the user terminal(s) of the first party and/or the second party. The user terminal(s) of the first party and/or the second party may display the third POI driving route. The first party and/or the second party may choose to watch the third POI driving route at any time he or she wants.

In some embodiments, one or more POIs on the third POI driving route may be predetermined by the first party and/or the second party, and the computer server may determine the third POI driving route based on the predetermined POI(s). For example, the first party (e.g., a tourist) may wish the third POI driving route to pass through one or more tourist attractions. As another example, the first party (e.g., a passenger) may predetermine one or more POIs where the passenger wish to stop by, to meet with someone or pick up a package. In some embodiments, the POI(s) may be predetermined by the first party when the first party send the service request. In some embodiments, the POI(s) may be predetermined by the second party when the second party accept the service request.

In some embodiments, the computer server may determine one or more POI driving routes. In some embodiments, the computer server may determine an optimal route among the POI driving routes as the third POI driving route for the first party and/or the second party. The optimal route may be determined based on current traffic condition information. In some embodiments, the computer server may send the POI driving routes to the first party and/or the second party, and the first party and/or the second party may select an optimal route as the third POI driving route.

In some embodiments, when the target vehicle is driving on the third POI driving route, the computer server may obtain, based on current traffic condition information (e.g., there may be a traffic jam on the third POI driving route), a fourth POI driving route from a current position of the target vehicle to the destination position. The computer server may send a message to the user terminal(s) of the first party and/or the second party to ask whether choose to change the third POI driving route to the fourth POI driving route.

In step 1060, the computer server may monitor a real-time position of the first party and/or the second party. The user terminal(s) of the first party and/or the second party may automatically send the real-time position to the computer server in real time. The computer server may obtain the real-time position of the first party and/or the second party to determine whether the first party and/or the second party is moving towards near a POI in the third POI driving route.

In step 1070, the computer sever may send the third POI driving route to the first party and/or the second party based on the real-time position of the first party and/or the second party. In some embodiments, when the real-time position of the first party and/or the second party is within a predetermined distance of a POI (e.g., a nearest POI of the real-time position), the computer server may send the third POI driving route to the first party and/or the second party. In some embodiments, the predetermined distance may be within a visible range of the driver (e.g., 70 meters, 80 meters, etc.). In some embodiments, the third POI driving route may direct the second party (e.g., the driver) to the destination position. In some embodiments, the third POI driving route may direct the second party to one or more predetermined intermediates point(s). In some embodiments, the computer server may send information regarding the POI(s) name, whether need to change direction, and/or when to change direction to the first and/or second party. In some embodiments, the user terminal associated with the first and/or second party may broadcast the third POI driving route. Upon listening to the broadcast of the third POI driving route, the first party and/or the second party may not need to watch the third POI driving route displayed on the user terminal(s).

It should be noted that in some embodiments, step 1030 and/or step 1040 may be not necessary. For example, when a current position of the first party may be the same as the pickup position, step 1030 may be omitted. As another example, when a current position of the second party may be the same as the pickup position, step 1040 may be omitted. Examples regarding the sending of a POI driving route may be illustrated in FIG. 11-A and FIG. 11-B.

FIG. 11-A is a primary view of an exemplary user interface of the online transportation service platform for displaying a map including a pickup position according to some embodiments of the present disclosure. The computer server may obtain the current position (e.g., Beijing Language and Culture University (BLCU)) of the first party (e.g., the passenger). And the computer sever may determine a POI (e.g., BLCU south gate) as a recommended pickup position for the first party based on the current position of the first party. In some embodiments, the computer server may obtain a first navigation route from the current position of the first party to the recommended pickup position (e.g., from BLCU to BLCU south gate). The computer server may send the recommended pickup position and/or the first navigation route to the user terminal of the first party. The user interface of an application installed in the user terminal of the first party may display the map showing the current position of the first party, the recommended pickup position, and/or the first navigation route (not shown). In some embodiments, the current position of the first party, the recommended pickup position, and/or the first navigation route may be highlighted (e.g., shown in different colors, in different fonts or sizes, in different tags, etc.).

The first navigation route may guide the first party to the pickup position. In some embodiments, the second party (e.g., the driver) may be not familiar with the current position of the first party, but may find the recommended pickup position more easily. Upon determining the recommended pickup position, the second party may not need to go to the current position of the first party, or even confirm the current position with the first party via telephone communication(s). Thus, the second party may pickup the first party more easily, the waiting time of the first party may be reduced, and order cancellation rate may be controlled accordingly.

FIG. 11-B is a primary view of an exemplary user interface of the online transportation service platform for displaying a map including a part of a POI driving route according to some embodiments of the present disclosure. The user terminal of the driver may display the POI driving route in the map. In some embodiments, the POI driving route shown in FIG. 11-B may be a part of the first navigation route, the second navigation route, or the third POI driving route. As shown in FIG. 11-B, the POI driving route may be highlighted by one or more arrows, and the arrow(s) may indicate a forward direction. When the driver is going forward along the POI driving route, the computer sever may monitor a real-time position of the driver (e.g., point A in FIG. 11-B). When the real-time position is within a predetermined range (e.g., 80 meters) of a next POI (e.g., Dianli Hospital), the computer server may send the POI driving route to the driver (e.g., turn right at Dianli Hospital front gate after 80 meters). The driver terminal may broadcast the POI driving route to the driver. Thus the driver may not need to watch the driving route shown in the user terminal. It should be noted that in addition to direction information and distance information, the computer server may send a specific POI orientation (e.g., Dianli Hospital front gate illustrated above) to the driver. Therefore, the driver may determine where to change the direction more easily and more accurately, especially when there are two or more intersections close to each other.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device" or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. An on-route transportations monitoring system for sending an emergency alert to a target terminal; comprising:
   one or more network ports to communicate with user terminals registered with an online transportation service platform;
   logic circuits coupled to the one or more network ports, wherein during operation the logic circuits:
      initiate a transportation transaction between a passenger of a vehicle and a driver of the vehicle through the online transportation service platform, the passenger accessing the online transportation service platform via a first user terminal associated with the passenger, the driver accessing the online transportation service platform via a second user terminal associated with the driver, the transportation transaction involving transporting the passenger from a departure position to a destination:

send first signals to the first user terminal to generate a first presentation including registration information of the driver;

confirm an occurrence of a predefined emergency by receiving an alert for the occurrence of the predefined emergency from the first user terminal when transporting the passenger from the departure position to the destination, the alert resulting from activation of an alert button as part of a user interface displayed by the first user terminal;

receive emergency information from the first user terminal; and send second signals including the emergency information to a target terminal, the emergency information including a location of the occurrence of the predefined emergency and the registration information of the driver.

2. The system of claim 1, wherein the target terminal includes at east a preset contact of the passenger.

3. The system of claim 1, wherein the target terminal is associated with a preset contact by the passenger, a public security bureau data center, or a police station.

4. The system of claim 1, wherein the target terminal is associated with a data center associated with the online transportation service platform.

5. The system of claim 1, wherein to send the second signals including the emergency information to the target terminal, the logic circuits further:

send the second signals to the target terminal to generate a second presentation including the emergency information.

6. The system of claim 1, wherein to send the second signals including the emergency information to the target terminal, the logic circuits further:

send the second signals to the target terminal in a form of message, call, or command.

7. The system of claim 1, wherein the registration information of the driver includes at least one of registered identification information of the vehicle, driver identity information of the vehicle, or a registration image of the vehicle.

8. The system of claim 7, wherein the logic circuits further:

send a reminder to the first user terminal to remind the passenger to verify whether actual identification information of the vehicle is consistent with the registered identification information, or whether actual identity information of the driver is consistent with the driver.

9. An on-route transportations monitoring method for sending an emergency alert to a target terminal, comprising:

initiating, by at least one electronic device of an online transportation service platform, a transportation transaction between a passenger of a vehicle and a driver of the vehicle through the online transportation service platform, the passenger accessing the online transportation service platform via a first user terminal associated with the passenger, the driver accessing the online transportation service platform via a second user terminal associated with the driver, the transportation transaction involving transporting the passenger from a departure position to a destination;

sending, by the at least one electronic device, first signals to the first user terminal to generate a first presentation including registration information of the driver;

confirming, by the at least one electronic device, an occurrence of a predefined emergency by receiving an alert for the occurrence of the predefined emergency from the first user terminal when transporting the passenger from the departure position to the destination, the alert resulting from activation of an alert button as part of a user interface displayed by the first user terminal;

receiving, by the at least one electronic device, emergency information from the first user terminal; and sending, by the at least one electronic device, second signals including the emergency information to a target terminal, the emergency information including a location of the occurrence of the predefined emergency and the registration information of the driver.

10. The method of claim 9, wherein the target terminal includes at least a preset contact of the passenger.

11. The method of claim 9, wherein the target terminal is associated with a preset contact by the passenger, a public security bureau data center, or a police station.

12. The method of claim 9, wherein the target terminal is associated with a data center associated with the online transportation service platform.

13. The method of claim 9, wherein the sending the second signals including the emergency information to the target terminal includes:

sending, by the at least one electronic device, the second signals to the target terminal to generate a second presentation including the emergency information.

14. The method of claim 9, wherein the sending the second signals including the emergency information to the target terminal includes:

sending, by the at least one electronic device, the second signals to the target terminal in a form of message, call, or command.

15. The method of claim 9, wherein the registration information of the driver includes at least one of registered identification information of the vehicle, driver identity information of the vehicle, or a registration image of the vehicle.

16. The method of claim 15, wherein the method further includes:

sending, by the at least one electronic device, a reminder to the first user terminal to remind the passenger to verify whether actual identification information of the vehicle is consistent with the registered identification information, or whether actual identity information of the driver is consistent with the driver.

17. An on-route transportations monitoring system for sending an emergency alert to a target terminal, comprising:

one or more network ports to communicate with user terminals registered with an online transportation service platform;

logic circuits coupled to the one or more network ports, wherein during operation the logic circuits:

initiate a transportation transaction between a passenger of a vehicle and a driver of the vehicle through the online transportation service platform, the passenger accessing the online transportation service platform via a first user terminal associated with the passenger, the driver accessing the online transportation service platform via a second user terminal associated with the driver, the transportation transaction involving transporting the passenger from a departure position to a destination;

send first signals to the first user terminal to generate a first presentation including registration information of the driver;

confirm an occurrence of a predefined emergency by receiving an alert for the occurrence of the predefined emergency from the first user terminal when transporting the passenger from the departure position to the destination, the alert resulting from activation of an alert button as part of a user interface displayed by the first user terminal;

receive the emergency information from the first user terminal; and send second signals including the emergency information to a target terminal associated with a preset contact of the passenger, a public security bureau data center, a police station, or a data center associated with the online transportation service platform, the emergency information including a location of the occurrence of the predefined emergency and the registration information of the driver.

18. The system of claim 17, wherein to send the second signals including the emergency information to the target terminal, the logic circuits further;

send the second signals to the target terminal to generate a second presentation including the emergency information.

19. The system of claim 17, herein;

the registration information of the driver includes registered identification information of the vehicle, driver identity information of the vehicle, and a registration image of the vehicle.

20. The system of claim 19, wherein the logic circuits further:

send a reminder to the first user terminal to remind the passenger to verify whether actual identification information of the vehicle is consistent with the registered identification information, or whether actual identity information of the driver is consistent with the driver.

21. An on-route transportations monitoring method for sending an emergency alert to a target terminal, comprising:

initiating, by at least one electronic device of an online transportation service platform, a transportation transaction between a passenger of a vehicle and a driver of the vehicle through the online transportation service platform, the passenger accessing the online transportation service platform via a first user terminal associated with the passenger, the driver accessing the online transportation service platform via a second user terminal associated with the driver, the transportation transaction involving transporting the passenger from a departure position to a destination;

sending, by the at least one electronic device, first signals to the first user terminal to generate a first presentation including registration information of the driver;

confirming, by the at least one electronic device, an occurrence of a predefined emergency by receiving an alert for the occurrence of the predefined emergency from the first user terminal when transporting the passenger from the departure position to the destination, the alert resulting from activation of an alert button as part of a user interface displayed by the first user terminal;

receiving, by the at least one electronic device, the emergency information from the first user terminal; and sending, by the at least one electronic device, second signals including the emergency information to a target terminal associated with a preset contact of the passenger, a public security bureau data center, a police station, or a data center associated with the online transportation service platform, the emergency information including a location of the occurrence of the predefined emergency and the registration information of the driver.

22. The method of claim 21, wherein the sending the second signals including the emergency information to the target terminal includes:

sending, by the at least one electronic device, the second signals to the target terminal to generate a second presentation including the emergency information.

23. The method of claim 21, wherein:

the registration information of the driver includes registered identification information of the vehicle, driver identity information of the vehicle, and a registration image of the vehicle.

24. The method of claim 23, wherein the method further includes:

sending, by the at least one electronic device, a reminder to the first user terminal to remind the passenger to verify whether actual identification information of the vehicle is consistent with the registered identification information, or whether actual identity information of the driver is consistent with the driver.

* * * * *